US010614745B2

United States Patent
Lee et al.

(10) Patent No.: US 10,614,745 B2
(45) Date of Patent: Apr. 7, 2020

(54) DISPLAY DEVICE HAVING A PLURALITY OF PIXEL AREAS

(71) Applicant: Samsung Display Co., Ltd., Yongin-si, Gyeonggi-do (KR)

(72) Inventors: Jae Sic Lee, Yongin-si (KR); Min Woo Byun, Yongin-si (KR); Jae Du Noh, Yongin-si (KR); Min Kyu Woo, Yongin-si (KR); Seung Yeon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/804,952

(22) Filed: Nov. 6, 2017

(65) Prior Publication Data

US 2018/0158396 A1 Jun. 7, 2018

(30) Foreign Application Priority Data

Dec. 7, 2016 (KR) ........................ 10-2016-0166201

(51) Int. Cl.
*G09G 3/20* (2006.01)
*G09G 3/32* (2016.01)
(Continued)

(52) U.S. Cl.
CPC ......... *G09G 3/2092* (2013.01); *G09G 3/3266* (2013.01); *G02B 13/06* (2013.01);
(Continued)

(58) Field of Classification Search
CPC .. G09G 3/2092; G09G 3/3266; G09G 3/3233; G09G 2300/0804;
(Continued)

(56) References Cited

U.S. PATENT DOCUMENTS 6,359,398 B1    3/2002   Nakajima et al.
6,583,779 B1 *  6/2003   Ushirono ............. G09G 3/3688
                                            345/100

(Continued)

FOREIGN PATENT DOCUMENTS

CN    105679234 A    6/2016
JP    2005-221695 A  8/2005

(Continued)

OTHER PUBLICATIONS

EPO Partial Search Report dated Apr. 5, 2018, for corresponding European Patent Application No. 17205882.8 (22 pages).

(Continued)

*Primary Examiner* — Stephen G Sherman
(74) *Attorney, Agent, or Firm* — Lewis Roca Rothgerber Christie LLP

(57) ABSTRACT

A display device includes a pixel unit including first pixels in a first pixel area, second pixels in a second pixel area, and third pixels in a third pixel area; a first scan driver including first multiplexers configured to operate in response to a first mode and a second mode different from the first mode, and to supply first scan signals to first scan lines connected to the first pixels; a second scan driver configured to supply second scan signals to second scan lines connected to the second pixels; and a third scan driver including second multiplexers configured to operate in response to the first mode and the second mode, and to supply third scan signals to third scan lines connected to the third pixels.

34 Claims, 12 Drawing Sheets

(51) Int. Cl.
  *G09G 3/3266* (2016.01)
  *G02B 27/01* (2006.01)
  *G09G 3/3233* (2016.01)
  *G02B 13/06* (2006.01)
(52) U.S. Cl.
  CPC .... *G02B 27/017* (2013.01); *G02B 2027/0123* (2013.01); *G09G 3/3233* (2013.01); *G09G 2300/0804* (2013.01); *G09G 2300/0861* (2013.01); *G09G 2310/0202* (2013.01); *G09G 2310/0205* (2013.01); *G09G 2310/0221* (2013.01); *G09G 2310/0232* (2013.01); *G09G 2310/0286* (2013.01); *G09G 2310/0297* (2013.01); *G09G 2310/04* (2013.01); *G09G 2320/02* (2013.01); *G09G 2320/043* (2013.01); *G09G 2340/0442* (2013.01)
(58) Field of Classification Search
  CPC ... G09G 2300/0861; G09G 2310/0202; G09G 2310/0205; G09G 2310/0221; G09G 2310/0232; G09G 2310/0286; G09G 2310/0297; G09G 2310/04; G09G 2320/02; G09G 2320/043; G09G 2340/0442; G02B 27/017
  See application file for complete search history.

(56) References Cited

U.S. PATENT DOCUMENTS

| | | | | |
|---|---|---|---|---|
| 8,531,366 | B2* | 9/2013 | Hu | G02F 1/136286 345/204 |
| 8,957,835 | B2* | 2/2015 | Hoellwarth | G02B 27/017 345/8 |
| 9,286,831 | B2 | 3/2016 | Qing et al. | |
| 2001/0017611 | A1 | 8/2001 | Moriyama | |
| 2004/0189583 | A1 | 9/2004 | Park et al. | |
| 2005/0024301 | A1* | 2/2005 | Funston | G09G 3/32 345/76 |
| 2006/0267623 | A1* | 11/2006 | Yoo | G01R 31/318533 324/760.01 |
| 2006/0267886 | A1 | 11/2006 | Ozaki et al. | |
| 2006/0273986 | A1* | 12/2006 | Hsu | G09G 3/293 345/60 |
| 2008/0042938 | A1 | 2/2008 | Cok | |
| 2009/0102778 | A1 | 4/2009 | Tu et al. | |
| 2010/0079356 | A1 | 4/2010 | Hoellwarth | |
| 2010/0123832 | A1* | 5/2010 | Kitayama | G09G 3/3611 348/731 |
| 2010/0128019 | A1 | 5/2010 | Harada | |
| 2012/0098822 | A1* | 4/2012 | Kim | G09G 3/003 345/419 |
| 2012/0139820 | A1* | 6/2012 | Senda | G09G 3/003 345/76 |
| 2012/0169574 | A1 | 7/2012 | Kim | |
| 2012/0212517 | A1 | 8/2012 | Ahn | |
| 2016/0055798 | A1* | 2/2016 | Song | G09G 3/3233 345/691 |
| 2016/0062125 | A1 | 3/2016 | Baek et al. | |
| 2016/0118023 | A1 | 4/2016 | Park et al. | |

FOREIGN PATENT DOCUMENTS

| | | |
|---|---|---|
| JP | 2016-532900 A | 10/2016 |
| WO | WO 2016/123983 A1 | 8/2016 |

OTHER PUBLICATIONS

MOS: Metal-Oxide-Silicon, Retrieved from the Internet: URL: http://ece-research.unm.edujimpivlsiislides/cl_basics.html, retrieved on Mar. 26, 2018, (17 pages).
EPO Extended Search Report dated Sep. 18, 2018, for corresponding European Patent Application No. 17205882.8 (32 pages).

* cited by examiner

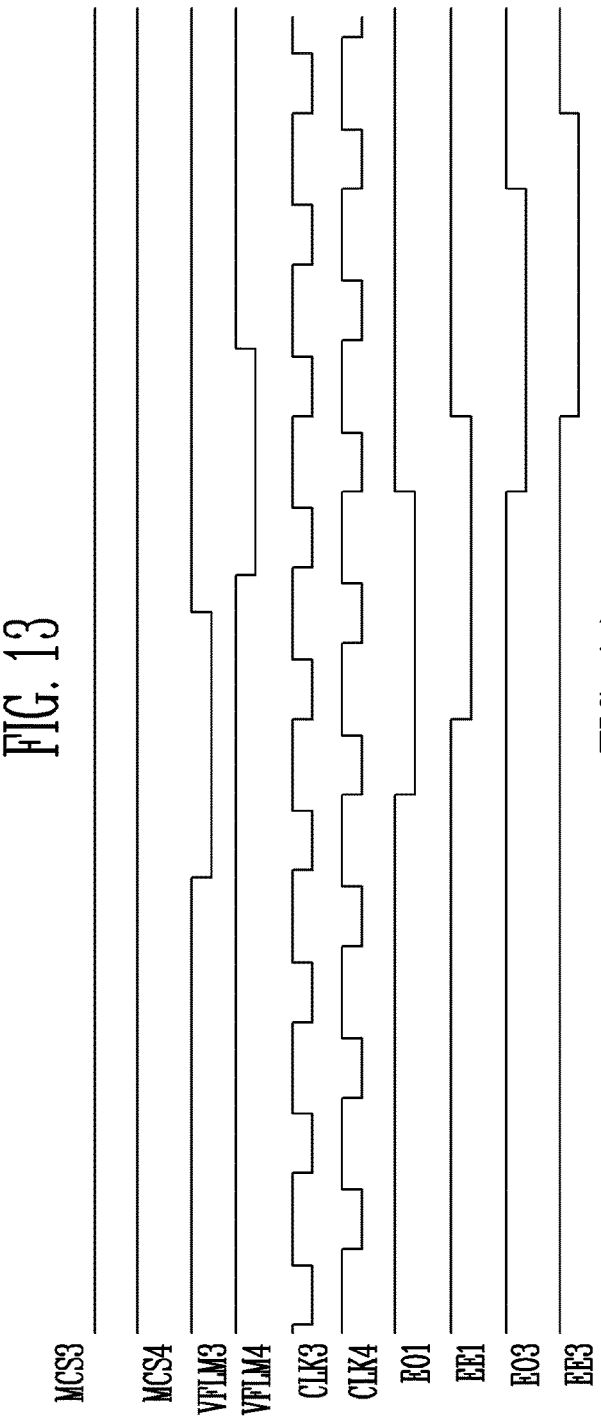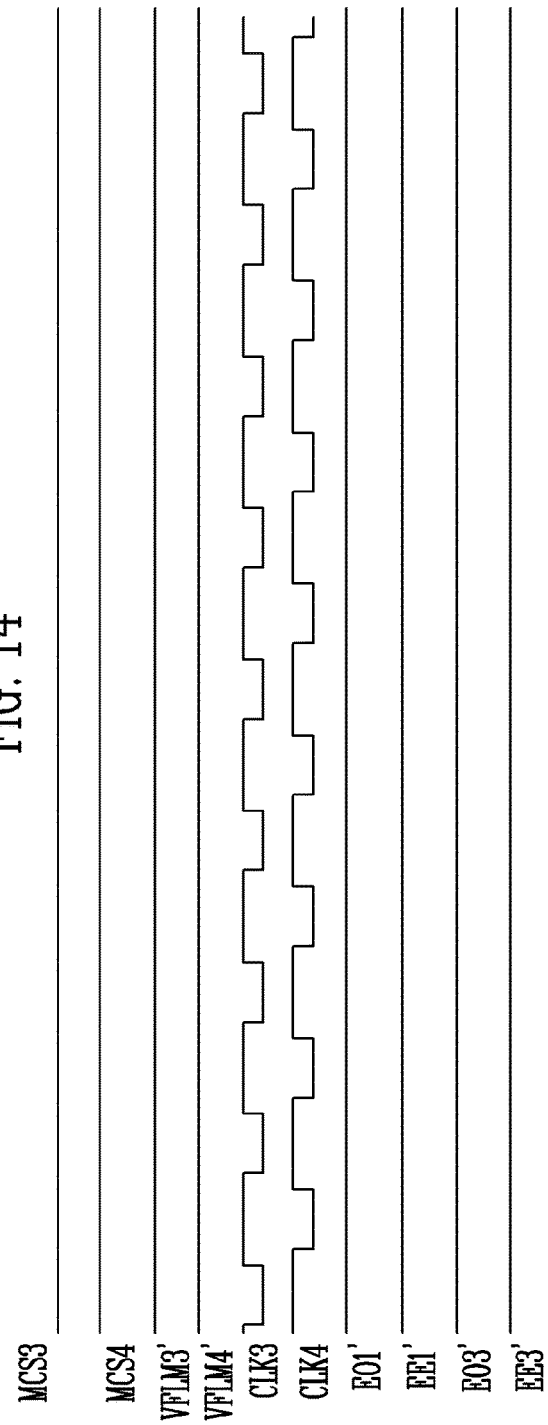

DISPLAY DEVICE HAVING A PLURALITY OF PIXEL AREAS

CROSS-REFERENCE TO RELATED APPLICATION

This application claims priority to and the benefit of Korean Patent Application No. 10-2016-0166201, filed on Dec. 7, 2016, in the Korean Intellectual Property Office, the entire content of which is incorporated herein by reference in its entirety.

BACKGROUND

1. Field

Aspects of some example embodiments of the present invention relate to a display device.

2. Description of the Related Art

Recently, various types of electronic devices which can be worn on the body have been developed. These devices are generally called wearable electronic devices.

Head mounted display (hereinafter "HMD") devices, which are one example of such wearable electronic devices, have been used for various purposes like watching movies because they provide a deep sense of immersion by displaying vivid images.

The above information discussed in this Background section is only for enhancement of understanding of the background of the described technology and therefore it may contain information that does not constitute prior art that is already known to a person having ordinary skill in the art.

SUMMARY

Aspects of some example embodiments of the present invention relate to a display device having improved display quality.

According to some example embodiments of the present invention, a display device may include: a pixel unit including first pixels in a first pixel area, second pixels in a second pixel area, and third pixels in a third pixel area; a first scan driver including first multiplexers configured to operate in response to a first mode and a second mode different from the first mode, and to supply first scan signals to first scan lines connected to the first pixels; a second scan driver configured to supply second scan signals to second scan lines connected to the second pixels; and a third scan driver including second multiplexers configured to operate in response to the first mode and the second mode, and to supply third scan signals to third scan lines connected to the third pixels.

According to some example embodiments, the first scan driver further comprises first scan stages connected to the first scan lines, respectively, and the first scan stages receive output signals from the first multiplexers.

According to some example embodiments, the third scan driver further comprises third scan stages connected to the third scan lines, respectively, and the third scan stages receive output signals from the second multiplexers.

According to some example embodiments, each of the first multiplexers includes a first switch configured to be turned on in the first mode and a second switch configured to be turned on in the second mode.

According to some example embodiments, the second switch of a 1st first multiplexer of the first multiplexers is configured to receive a first start signal and second switches of remaining first multiplexers are configured to receive output signals from first scan stages located in a previous horizontal line.

According to some example embodiments, the first switch of a last first multiplexer is configured to receive a second start signal and first switches of remaining first multiplexer are configured to receive a first sub-start signal.

According to some example embodiments, the first sub-start signal is simultaneously supplied to the first scan stages in the first mode.

According to some example embodiments, the first scan signals are simultaneously supplied to first scan lines located in odd horizontal lines, and the first scan signals are simultaneously supplied to first scan lines located in even horizontal lines.

According to some example embodiments, each of the second multiplexers includes a first switch configured to be turned on in the first mode and a second switch configured to be turned on in the second mode.

According to some example embodiments, first switches of the second multiplexers are configured to receive a second sub-start signal, and second switches of the second multiplexers are configured to receive output signals from scan stages located in the previous horizontal line.

According to some example embodiments, the second sub-start signal is simultaneously supplied to the third scan stages in the first mode.

According to some example embodiments, the third scan signals are simultaneously supplied to the scan lines located in the odd horizontal lines, and third scan signals are simultaneously supplied to third scan lines located in the even horizontal lines.

According to some example embodiments, the first scan driver, the second scan driver and the third scan driver are configured to sequentially output the first scan signals, the second scan signals and the third scan signals, respectively, during a single frame period in the second mode.

According to some example embodiments, the first scan driver, the second scan driver and the third scan driver are configured to sequentially output the second scan signals after outputting the first scan signals and the third scan signals in the first mode.

According to some example embodiments, in the first mode, a pulse width of each of the first scan signals and the third scan signals is greater than a pulse width of each of the second scan signals.

According to some example embodiments, the first pixel area is adjacent to a first horizontal line of the second pixel area and the third pixel area is adjacent to a last horizontal line of the second pixel area.

According to some example embodiments, the display device further includes a data driver configured to supply data signals to data lines connected to the first pixels, the second pixels and the third pixels.

According to some example embodiments, the display device further includes a memory configured to store a first dummy data signal corresponding to an image displayed on the first horizontal line of the second pixel area and a second dummy data signal corresponding to an image displayed on the last horizontal line of the second pixel area during a previous frame in the first mode.

According to some example embodiments, the data driver is configured to supply the first dummy data signal to the first pixels and the second dummy data signal to the third pixels in the first mode.

According to some example embodiments, the display device further includes: a first emission driver including third multiplexers configured to operate in response to the first mode and the second mode, and to supply first emission signals to first emission lines connected to the first pixels; a second emission driver configured to supply second emission signals to second emission lines connected to the second pixels; and a third emission driver including fourth multiplexers configured to operate in response to the first mode and the second mode, and to supply third emission signals to third emission lines connected to the third pixels.

According to some example embodiments, the first emission driver further comprises first emission stages connected to the first emission lines, respectively, and the first emission stages are configured to receive output signals from the third multiplexers.

According to some example embodiments, the third emission driver further comprises third emission stages connected to the third emission lines, respectively, and the third emission stages are configured to receive output signals from the fourth multiplexers.

According to some example embodiments, each of the third multiplexers and the fourth multiplexers includes a first switch configured to be turned on in the first mode and a second switch configured to be turned on in the second mode.

According to some example embodiments, the second switch of a 1st third multiplexer of the third multiplexers is configured to receive a third start signal, and second switches of remaining third multiplexers are configured to receive output signals from first emission stages located in the previous horizontal line.

According to some example embodiments, the first switch of a last third multiplexer is configured to receive a fourth start signal and first switches of remaining third multiplexers are configured to receive a third sub-start signal.

According to some example embodiments, the third sub-start signal is simultaneously supplied to the first emission stages in the first mode.

According to some example embodiments, in the first mode, the first emission signals are simultaneously supplied to first emission lines located in odd horizontal lines, and the first emission signals are simultaneously supplied to first emission lines located in even horizontal lines.

According to some example embodiments, first switches of the fourth multiplexers are configured to receive a fourth sub-start signal, and second switches of the fourth multiplexers are configured to receive output signals from emission stages located in the previous horizontal line.

According to some example embodiments, the fourth sub-start signal is simultaneously supplied to the third emission stages in the first mode.

According to some example embodiments, in the first mode, the third emission signals are simultaneously supplied to third emission lines located in odd horizontal lines, and the third emission signals are simultaneously supplied to third emission lines located in even horizontal lines.

According to some example embodiments, the first emission driver, the second emission driver and the third scan driver are configured to cause the first pixel area, the second pixel area and the third pixel area to sequentially emit light during a single frame period in the second mode.

According to some example embodiments, the first emission driver, the second emission driver and the third scan driver are configured to cause the second pixel area to emit light after the first pixel area and the third pixel area emit light during a single frame period in the first mode.

According to some example embodiments, in the first mode, during a current frame, each horizontal line of the first pixel area is configured to display the same image as an image displayed on a first horizontal line of the second pixel area during a previous frame.

According to some example embodiments, in the first mode, during the current frame, each horizontal line of the third pixel area is configured to display the same image as an image displayed on a last horizontal line of the second pixel area during the previous frame.

According to some example embodiments, the display device is set to the first mode when the display device is mounted on a wearable device, and otherwise, set to the second mode.

BRIEF DESCRIPTION OF THE DRAWINGS

Aspects of some example embodiments are described hereinafter with reference to the accompanying drawings. The present system and method, however, should not be construed as being limited to these embodiments. Rather, these embodiments are provided to facilitate the understanding by those of ordinary skill in the art.

In the drawings, the dimensions of the figures may be exaggerated for clarity. It is understood that when an element is referred to as being "between" two elements, it may be the only element between the two elements, or one or more intervening elements may also be present, unless otherwise indicated. Like reference numerals refer to like elements throughout.

FIGS. 13 and 14 are waveform views illustrating emission drivers shown in FIGS. 9 and 11 when a display device is driven in a first mode, according to some example embodiments of the present invention.

DETAILED DESCRIPTION

Figure 1A:
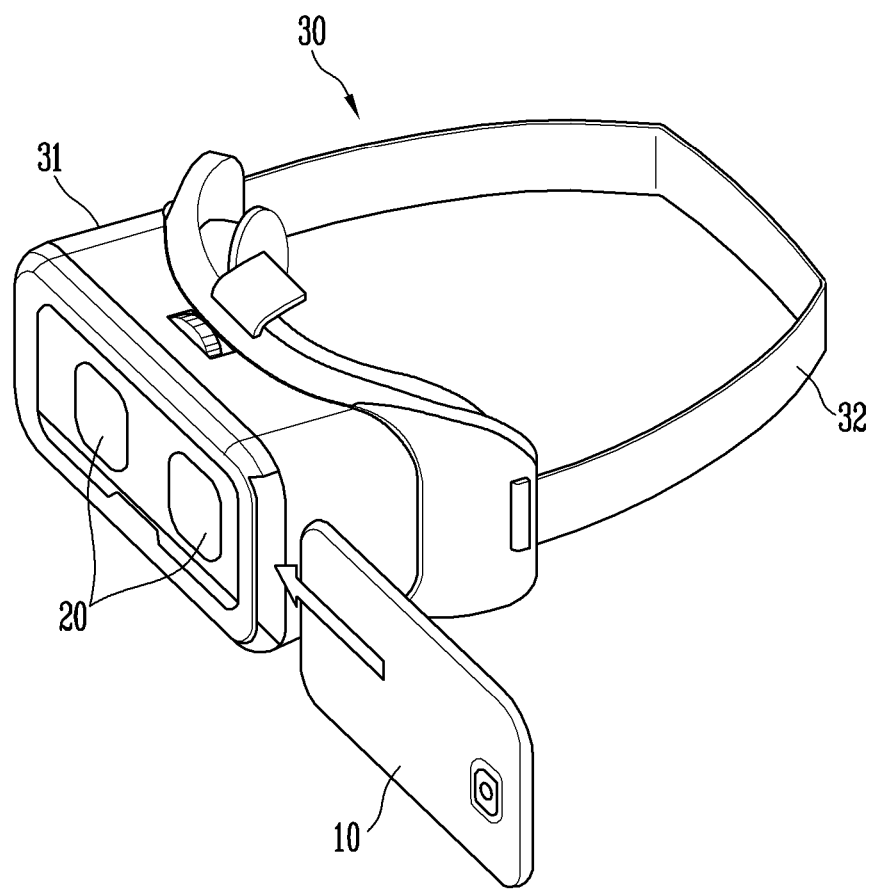
FIGS. 1A to 1C are diagrams illustrating an example embodiment of a display device connected to a wearable device, according to some example embodiments of the present invention.

While some aspects of some example embodiments of the present invention are described with reference to the accompanying drawings, it is to be understood that various changes and modifications may be made in the invention without departing from the spirit and scope thereof. Further, it should be understood that the invention is not limited to the specific embodiments thereof, and various changes, equivalences, and substitutions may be made without departing from the scope and spirit of the invention.

Like reference numerals designate like elements throughout the drawings. In the drawings, the dimension of elements may be exaggerated for the clarity of this invention. Although terms "first", "second", etc. are used herein to describe various elements, these elements should not be limited by these terms. These terms are only used to distinguish one element from another element. For example, the first element may be designated as the second element without departing from the scope of the invention. Similarly, the second element may be designated as the first element. Further, the singular forms "a" and "an" include plural referents unless the context clearly dictates otherwise.

Hereinafter, a display device according to some example embodiments will be described in more detail with reference to the accompanying drawings.

Figure 1B:
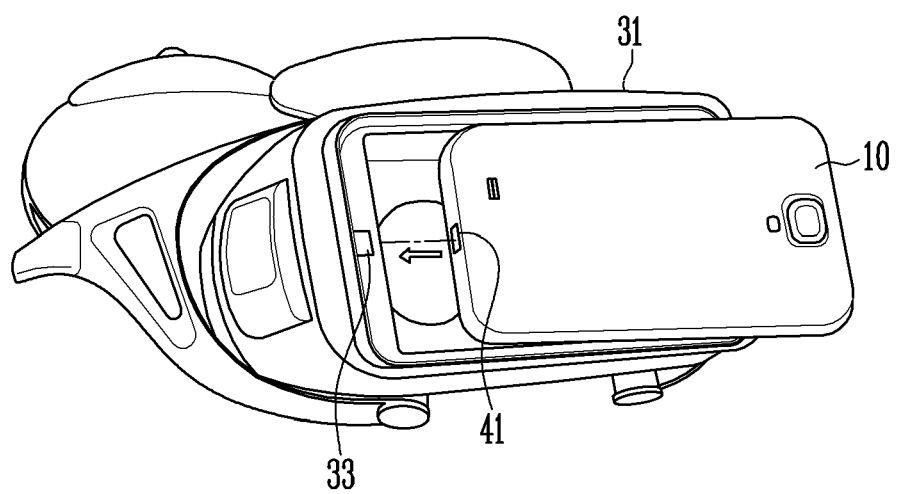
Figure 1C:
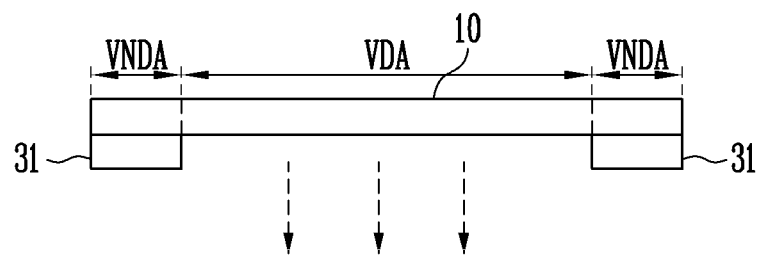

FIGS. 1A to 1C are diagrams illustrating a display device 10 mounted on a wearable device 30, according to some example embodiments of the present invention.

Referring to FIGS. 1A to 1C, the wearable device 30 may be a head mounted type device and include a frame 31. A band 32 may be connected to the frame 31. A user may wear the frame 31 using the band 32. The display device 10 may be detachable from the frame 31. The display device 10 mounted on the wearable device 30 may be, for example, a smartphone. However, the display device 10 according to example embodiments of the present invention is not limited to smartphones. For example, the display device 10 may include any suitable electronic equipment with a display unit, such as table PCs, electronic book readers, computers, workstations, personal digital assistants (PDAs), portable multimedia players (PMPs), cameras, and the like.

According to some example embodiments, when the display device 10 is mounted on the frame 31, a connection portion 41 of the display device 10 and a connection portion 33 of the frame 31 may be electrically connected to each other, so that communications may be established between the frame 31 and the display device 10.

To control the display device 10 mounted on the frame 31, the wearable device 30 may include at least one of a touch sensor, a button, and a wheel key.

When the display device 10 is mounted on the wearable device 30, the display device 10 may operate as a head mounted display (HMD) device. In other words, when the display device 10 is mounted on the wearable device 30, the display device 10 may be driven in a first mode (e.g., a virtual reality (VR) or augmented reality (AR) Mode). When the display device 10 is separated from the wearable device 30, the display device 10 may be driven in a second mode (e.g., a Normal Mode).

When the display device 10 is mounted on the wearable device 30, a driving mode of the display device 10 may be switched to the first mode automatically, or in response to a user input or setting adjustment. In addition, when the display device 10 is separated from the wearable device 30, the driving mode of the display device 10 may be switched to the second mode automatically or in response to a user input or setting adjustment.

The wearable device 30 may include lenses 20 corresponding to user's eyes. The lenses 20 may be set to fisheye lenses or wide-angle lenses so as to extend the user's field of view (FOV).

When the display device 10 is secured to the frame 31, the user may see a display unit of the display device 10 through the lenses 20. Therefore, the user may perceive that they are viewing an image on a large-size screen at a predetermined distance.

Referring to FIG. 1C, when the wearable device 30 is mounted on the display device 10, a portion of a display area may be blocked by the frame 31 so as to provide the user with more vivid images.

A portion of the entire display area of the display device 10 that the user views corresponding to the first mode is referred to as a viewing area VDA. The other portion of the entire display area of the display device 10 driven in the first mode that the user cannot view is referred to as a non-viewing area VNDA.

A central part of the display area corresponding to the positions of the lenses 20 may be the viewing area VDA, and the remaining part may be the non-viewing area VNDA.

When the display device 10 is driven in the first mode, an effective image may be displayed on the viewing area VDA. The image may not be displayed on the non-viewing area VNDA, or a dummy image may be displayed thereon.

On the other hand, when the display device 10 is driven in the second mode, the user may view the entire display area. Thus, an effective image may be displayed over the entire display area.

According to an embodiment, when the display device 10 is used in conjunction with the wearable device 30, various forms of images may be displayed. However, as described above, because the effective image is displayed on different areas depending on the first mode and the second mode, the boundaries between the viewing area and the non-viewing area may be visible to the user when the driving mode of the display device 10 is switched.

Therefore, when an image is displayed on the display device 10 mounted on the wearable device 30, the boundaries between the viewing area and the non-viewing area may not be visible or perceptible to the user.

Figure 2:
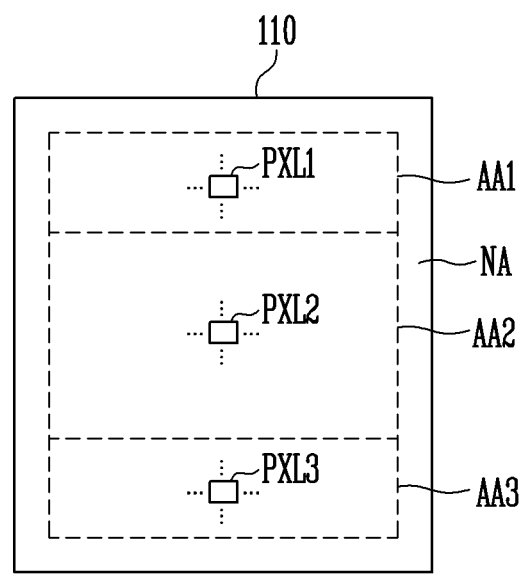
FIG. 2 is a diagram illustrating a substrate provided in the display device shown in FIG. 1, according to some example embodiments of the present invention.

FIG. 2 is a diagram illustrating a pixel area of the display device 10 according to some example embodiments.

Referring to FIG. 2, according to some example embodiments, a substrate 110 may include pixel areas AA1, AA2, and AA3. The substrate may further include a peripheral area NA outside the footprint of or surrounding the pixel areas AA1, AA2, and AA3.

A plurality of pixels PXL1, PXL2, and PXL3 may be located in the pixel areas AA1, AA2, and AA3, respectively. A predetermine image may be displayed on the pixel areas AA1, AA2, and AA3. Thus, the pixel areas AA1, AA2, and AA3 may be collectively referred to as a display area.

Components (e.g., wires) for driving the pixels PXL1, PXL2, and PXL3 may be located in the peripheral area NA. Because the pixels PXL1, PXL2, and PXL3 are not present in the peripheral area NA, the peripheral area NA may be referred to as a non-display area.

For example, the peripheral area NA may be provided outside the pixel areas AA1, AA2, and AA3 and surround at least portions of the pixel areas AA1, AA2, and AA3.

The pixel areas AA1, AA2, and AA3 may include a first pixel area AA1, a second pixel area AA2 located at one side of the first pixel area AA1, and a third pixel area AA3 located at one side of the second pixel area AA2.

The second pixel area AA2 may be located between the first pixel area AA1 and the third pixel area AA3 and have a greater area than the first pixel area AA1 and the third pixel area AA3.

The second pixel area AA2 may correspond to the viewing area VDA shown in FIG. 1C and the first and third pixel areas AA1 and AA3 may correspond to the non-viewing area VNDA.

In other words, when the display device 10 is driven in the first mode, the user may be unable to see an image displayed on the first pixel area AA1 and the third pixel area AA3 and may only be able to see an image displayed on the second pixel area AA2.

On the other hand, when the display device 10 is driven in the second mode, the user may see an image displayed on the first, second, and third pixel areas AA1, AA2, and AA3.

The pixels PXL1, PXL2, and PXL3 may include first pixels PXL1, second pixels PXL2 and third pixels PXL3.

For example, the first pixels PXL1 may be located in the first pixel area AA1, the second pixels PXL2 may be located in the second pixel area AA2, and the third pixels PXL3 may be located in the third pixel area AA3.

Each of the pixels PXL1, PXL2, and PXL3 may emit light at a brightness (e.g., a predetermined brightness) in response to control of each driver. Each of the pixels PXL1, PXL2, and PXL3 may include an emission device (e.g., an organic light emitting diode).

FIG. 2 illustrates that the first pixel area AA1, the second pixel area AA2 and the third pixel area AA3 have the same width. However, example embodiments of the present invention are not limited thereto. For example, according to some example embodiments, the first pixel area AA1 and/or the third pixel area AA3 may gradually decrease in width away from the second pixel area AA2. Additionally, the first pixel area AA1 and/or the third pixel area AA3 may have a smaller width than the second pixel area AA2. The first pixel area AA1 and/or the third pixel area AA3 may comprise a plurality of first and/or third pixel areas arranged in a vertical direction or a horizontal direction.

The substrate 110 may have various forms so that the above-described pixel areas AA1, AA2, and AA3 may be arranged thereon. The substrate 110 may include an insulating material such as glass or resin. In addition, the substrate 110 may include materials having flexibility so that the substrate 110 may be bendable or foldable. The substrate 110 may have a single-layer structure or a multilayer structure.

Figure 3:
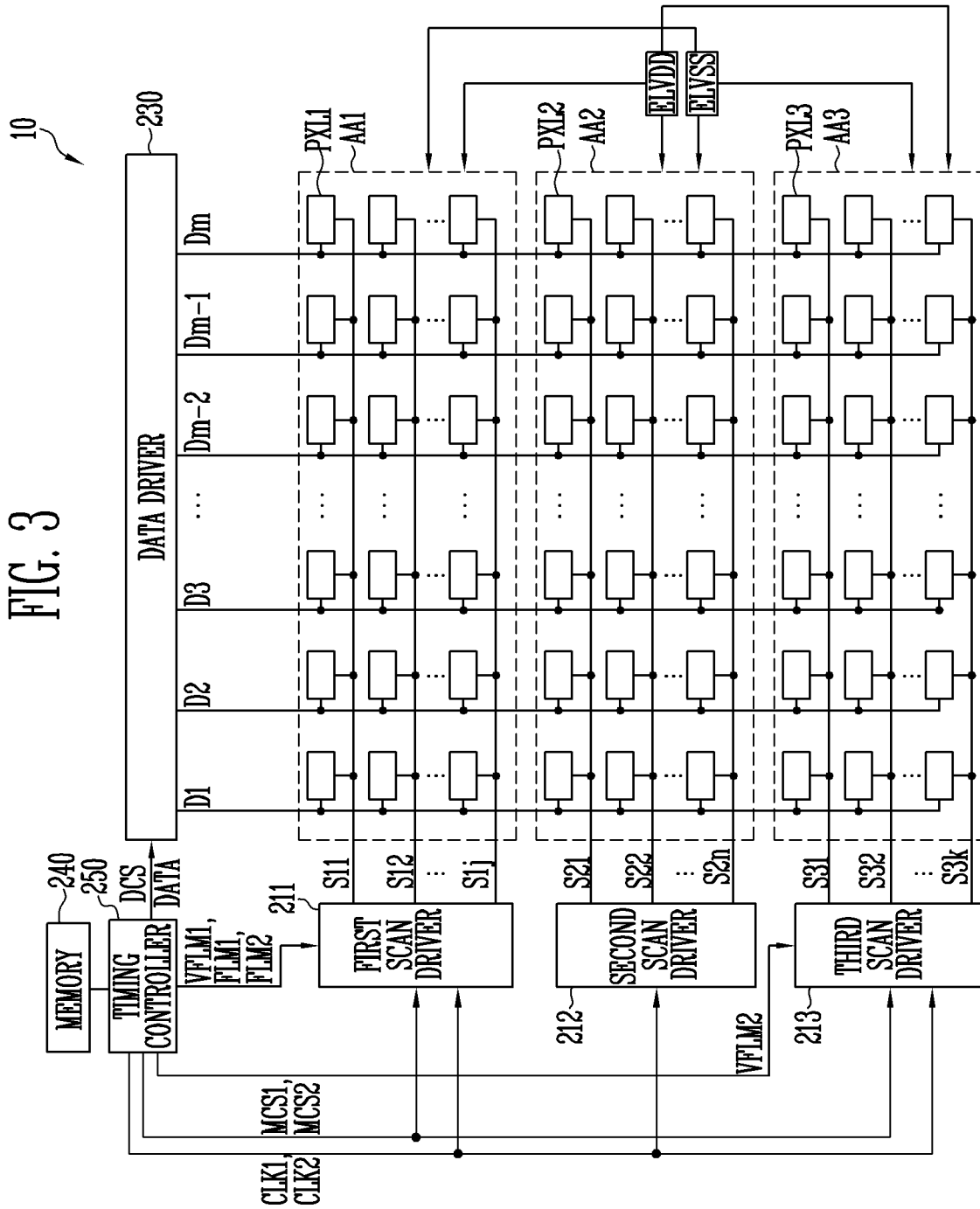
FIG. 3 is a diagram illustrating an example configuration of a display device, according to some example embodiments of the present invention.

FIG. 3 is a diagram illustrating the configuration of the display device 10 according to some example embodiments of the present invention. Referring to FIG. 3, the display device 10 may include the pixels PXL1, PXL2, and PXL3 and a display driver. The display driver may include a first scan driver 211, a second scan driver 212, a third scan driver 213, a data driver 230, a memory 240 and a timing controller 250.

The first pixels PXL1 may be located in the first pixel area AA1 divided by first scan lines S11 to S1$j$ and data lines D1 to Dm. The first pixels PXL1 may receive data signals from the data lines D1 to Dm when scan signals are supplied from the first scan lines S11 to S1$j$. Each of the first pixels PXL1 receiving the data signals may control the amount of current flowing from a first power supply ELVDD to a second power supply ELVSS via the organic light emitting diode. The organic light emitting diode of each of the first pixels PXL1 may generate light of brightness corresponding to the current amount.

The second pixels PXL2 may be located in the second pixel area AA2 divided by second scan lines S21 to S2$n$ and the data lines D1 to Dm. The second pixels PXL2 may receive data signals from the data lines D1 to Dm when scan signals are provided from the second scan lines S21 to S2$n$. Each of the second pixels PXL2 receiving the data signals may control the amount of current flowing from the first power supply ELVDD to the second power supply ELVSS via the organic light emitting diode. The organic light emitting diode of each of the second pixels PXL2 may generate light having a brightness level corresponding to the current amount.

The third pixels PXL3 may be located in the third pixel area AA3 divided by third scan lines S31 to S3$k$ and the data lines D1 to Dm. The third pixels PXL3 may receive data signals from the data lines D1 to Dm when scan signals are supplied from the third scan lines S31 to S3$k$. Each of the third pixels PXL3 receiving the data signals may control the amount of current flowing from the first power supply ELVDD to the second power supply ELVSS through the organic light emitting diode. The organic light emitting diode of each of the third pixels PXL3 may generate light of brightness corresponding to the current amount.

When the display device 10 is driven in the second mode, an effective image may be displayed on the first pixel area AA1, the second pixel area AA2, and the third pixel area AA3. In other words, the user may see an image displayed on the first pixel area AA1, the second pixel area AA2, and the third pixel area AA3.

When the display device 10 is driven in the first mode, an effective image may be displayed on the second pixel area AA2, and the first and third pixel areas AA1 and AA3 may be covered by the frame 31 of the wearable device 30.

When the display device 10 is driven in the first mode, because the first pixel area AA1 and the third pixel area AA3 are not visible to the user, the first pixel area AA1 and the third pixel area AA3 may be blocked from displaying an image.

Scan signals may not be provided to the first scan lines S11 to S1$j$ and the third scan lines S31 to S3$k$ connected to the first pixels PXL1 and the third pixels PXL3, respectively, and separate data signals may not be supplied to the first pixels PXL1 and the third pixels PXL3.

However, when the second pixels PXL2 are driven, if the first pixels PXL1 and the third pixels PXL3 are not driven, characteristics of driving transistors included in the first pixel PXL1 and the third pixel PXL3 may be different from those of a driving transistor included in the second pixel PXL2.

As a result, when the driving mode switches from the first mode to the second mode, a luminance deviation may occur between the second pixel area AA2 and the first and third pixel areas AA1 and AA3 due to a characteristic deviation between the driving transistors included in the pixel areas AA1, AA2, and AA3. In addition, the boundaries between the first pixel area AA1 and the second pixel area AA2 and the boundaries between the second pixel area AA2 and the third pixel area AA3 may be visible to the user.

However, according to some example embodiments of the present invention, when the display device 10 is driven in the first mode, the first pixels PXL1 and the third pixels PXL3 may be driven by supplying scan signals and data signals (e.g., dummy data signals) to the first pixels PXL1 and the third pixels PXL3, so that the boundaries may be prevented from being visible due to the characteristic deviation of the driving transistors.

The first scan driver 211 may supply scan signals to the first scan lines S11 to S1j in response to first scan control signals (CLK1, CLK2, MCS1, MCS2, VFLM1, FLM1, and FLM2) from the timing controller 250. For example, the first scan driver 211 may sequentially supply first scan signals to the first scan lines S11 to S1j. When the first scan signals are sequentially supplied to the first scan lines S11 to S1j, the first pixels PXL1 may be sequentially selected in a horizontal line unit.

In addition, the first scan driver 211 may simultaneously supply the first scan signals to the first scan lines S11 to S1j. For example, the first scan signals may be simultaneously supplied to odd first scan lines S11, S13, S15, . . . , and the first scan signals may be simultaneously supplied to even first scan lines S12, S14, S16, . . . at the same time.

The second scan driver 212 may supply scan signals to the second scan lines S21 to S2n in response to second scan control signals (CLK1 and CLK2) from the timing controller 250. For example, the second scan driver 212 may sequentially supply second scan signals to the second scan lines S21 to S2n. When the second scan signals are sequentially supplied to the second scan lines S21 to S2n, the second pixels PXL2 may be sequentially selected in a horizontal line unit.

The third scan driver 213 may supply scan signals to the third scan lines S31 to S1k in response to third scan control signals (CLK1, CLK2, MCS1, MCS2, and VFLM2) from the timing controller 250.

For example, the third scan driver 213 may sequentially supply the third scan signals to the third scan lines S31 to S3k. When the third scan signals are sequentially supplied to the third scan lines S31 to S3k, the third pixels PXL3 may be sequentially selected in a horizontal line unit.

In addition, the third scan driver 213 may supply the third scan signals to the third scan lines S31 to S3k at the same time. For example, the third scan signals may be supplied to odd third scan lines S31, S33, S35, . . . at the same time, and the third scan signals may be supplied to even third scan lines S32, S34, S36, . . . at the same time.

The first scan signal, the second scan signal, and the third scan signal may be set to voltages that turn on the corresponding transistors. In terms of the entire display device 10, when the display device 10 is driven in the second mode, the first pixels PXL1 may be sequentially selected in the horizontal line unit, the second pixels PXL2 may then be sequentially selected in the horizontal line unit, and lastly, the third pixels PXL3 may be sequentially selected in the horizontal line unit. In addition, when the display device is driven in the first mode, the first pixels PXL1 in odd horizontal lines may be selected at the same time, the first pixels PXL1 in even horizontal lines may be selected at the same time, the third pixels PXL3 in odd horizontal lines may be selected at the same time, and the third pixels PXL3 located in even horizontal lines may be selected at the same time. Lastly, the second pixels PXL2 may be sequentially selected in the horizontal line unit.

According to some example embodiments, the display driver may further include the memory 240. According to some example embodiments, when the display device 10 is driven in the first mode, the memory 240 may store dummy data signals to be supplied to the first pixels PXL1 and the third pixels PXL3.

For example, the memory 240 may store data signals supplied to second pixels adjacent to the first pixel area AA1 (e.g., the second pixels PXL2 connected to the 1st second scan line S21), among the second pixels PXL2, as first dummy data signals during the previous frame. The first dummy data signals may be supplied to the first pixels PXL1 in the current frame in the first mode.

In addition, data signals supplied to second pixels adjacent to the third pixel area AA3 (e.g., the second pixels PXL2 connected to the last second scan line S2n), among the second pixels PXL2, may be stored as second dummy data signals in the memory 240. The second dummy data signals may be supplied to the third pixels PXL3 in the current frame in the first mode.

The data driver 230 may supply data signals to the data lines D1 to Dm in response to a data control signal DCS. The data signals supplied to the data lines D1 to Dm may be supplied to the pixels PXL1, PXL2, and PXL3 selected by the scan signals. The timing controller 250 may supply scan control signals generated on the basis of externally supplied timing signals to the scan drivers 211, 212, and 213.

The first scan control signals may include switch control signals MCS1 and MCS2, clock signals CLK1 and CLK2, start signals FLM1 and FLM2 and a first sub-start signal VFLM1. The first start signal FLM1 and the first sub-start signal VFLM1 may be applied to control supply timing of the first scan signals, and the clock signals CLK1 and CLK2 may be applied to shift the first start signal FLM1. In addition, the switch control signals MCS1 and MCS2 may be applied to determine an output signal of a multiplexer to be described below.

The second scan control signals may include the clock signals CLK1 and CLK2. The clock signals CLK1 and CLK2 may be used to shift the last scan signal S1j of the first scan driver. The third scan control signals may include the switch control signals MCS1 and MCS2, the clock signals CLK1 and CLK2 and a second sub-start signal VFLM2. The first sub-start signal VFLM1 may be applied to control supply timing of the third scan signals, and the switch control signals MCS1 and MCS2 may be applied to determine an output signal of a multiplexer to be described below.

The timing controller 250 may supply the data control signal DCS to the data driver 230. In addition, the timing controller 250 may convert externally input image data into image data DATA which meets the specifications of the data driver 230. The data control signal DCS may include a source start signal, a source output enable signal, and a source sampling clock. The source start signal may be applied to control a data sampling start point of the data driver 230. The source sampling clock may control a sampling operation of the data driver 230 on the basis of a rising or falling edge. The source output enable signal may control output timing of the data driver 230.

FIG. 3 illustrates the scan drivers 211, 212, and 213, the data driver 230, memory 240 and the timing controller 250 as separate components. However, according to some example embodiments, at least some of the components may be incorporated into a same component. In addition, the scan drivers 211, 212, and 213, the data driver 230, the memory 240 and the timing controller 250 may be provided by various methods such as chip on glass, chip on plastic, tape carrier package, and chip on film.

Figure 4:
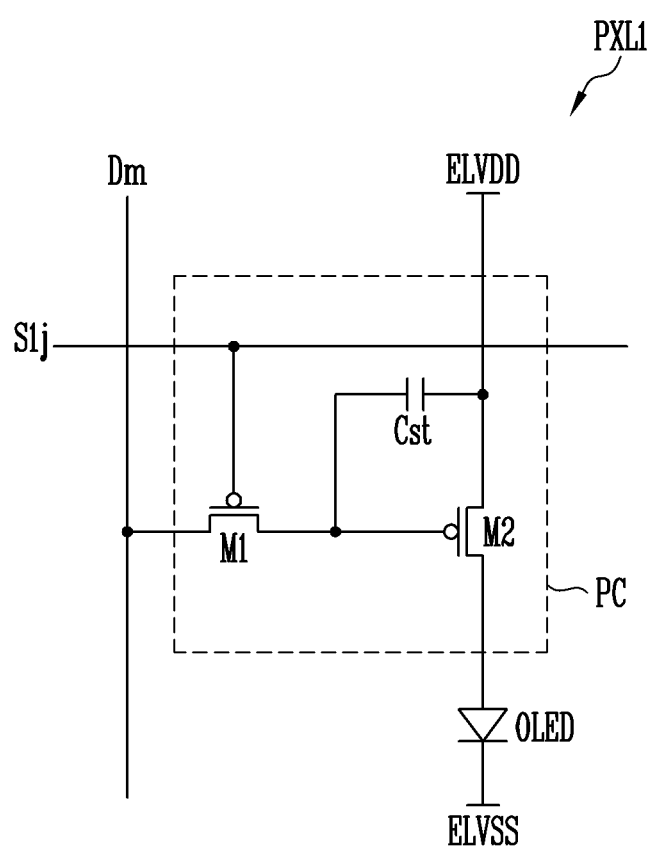
FIG. 4 is a diagram illustrating an embodiment of a pixel shown in FIG. 3, according to some example embodiments of the present invention.

FIG. 4 is an embodiment of one of the first pixels PXL1 shown in FIG. 3. For convenience of explanation, FIG. 4 illustrates the first pixel PXL1 connected to the jth first scan line S1$j$ and the mth data line Dm as shown in FIG. 3. Referring to FIG. 4, the first pixel PXL1 may include a pixel circuit PC that is connected to an organic light emitting diode OLED, the mth data line Dm and the jth first scan line S1$j$ and configured to control the organic light emitting diode OLED. An anode electrode of the organic light emitting diode OLED may be connected to the pixel circuit PC and a cathode thereof may be connected to the second power supply ELVSS.

The organic light emitting diode OLED may generate light (e.g., of a predetermined brightness) in response to current supplied from the pixel circuit PC. The pixel circuit PC may store a data signal supplied to the mth data line Dm when a scan signal is supplied to the jth first scan line S1$j$ and control the amount of current flowing to the organic light emitting diode OLED in response to the stored data signal. For example, the pixel circuit PC may include a first transistor M1, a second transistor M2 and a storage capacitor Cst.

The first transistor M1 may be connected between the mth data line Dm and the second transistor M2. For example, the first transistor M1 may have a gate electrode connected to the jth first scan line S1$j$, a first electrode connected to the mth data line Dm, and a second electrode connected to a gate electrode of the second transistor M2. The first transistor M1 may be turned on when the scan signal is supplied from the jth first scan line S1$j$, and supply the data signal from the mth data line Dm to the storage capacitor Cst. The storage capacitor Cst may be charged with a voltage corresponding to the data signal. The second transistor M2 may be connected between the first power supply ELVDD and the organic light emitting diode OLED.

For example, the second transistor M2 may have the gate electrode connected to a first electrode of the storage capacitor Cst and the second electrode of the first transistor M1, a first electrode connected to a second electrode of the storage capacitor Cst and the first power supply ELVDD, and a second electrode connected to the anode electrode of the organic light emitting diode OLED.

The second transistor M2 may be a driving transistor and control the amount of current flowing from the first power supply ELVDD via the organic light emitting diode OLED to the second power supply ELVSS in response to a voltage value stored in the storage capacitor Cst. The organic light emitting diode OLED may generate light corresponding to the amount of current supplied from the second transistor M2.

The first electrode of each of the transistors M1 and M2 may be set to one of a source electrode and a drain electrode, and the second electrode of each of the transistors M1 and M2 may be set to the other electrode. For example, when the first electrode is set to a source electrode, the second electrode may be set to a drain electrode. In addition, as illustrated in FIG. 4, for example, the transistors M1 and M2 may be PMOS transistors. According to another embodiment, the transistors M1 and M2 may be NMOS transistors.

The structure of the pixel shown in FIG. 4 may correspond to an embodiment. The first pixel PXL1 of the present invention is not limited to the above pixel structure. The first pixel PXL1 may have a circuit configuration so that current may be supplied to the organic light emitting diode OLED. Any one of various configurations currently known in the art may be used as the circuit configuration of the first pixel PXL1.

The first power supply ELVDD may be a high-potential power supply and the second power supply ELVSS may be a low-potential power supply. For example, the first power supply ELVDD may be set to a positive voltage and the second power supply ELVSS may be set to a negative voltage or a ground voltage.

Each of the second pixel PXL2 and the third pixel PXL3 may have the same (or substantially the same) circuit configuration as the first pixel PXL1. Therefore, repetitive description of the second pixel PXL2 and the third pixel PXL3 will be omitted.

Figure 5:
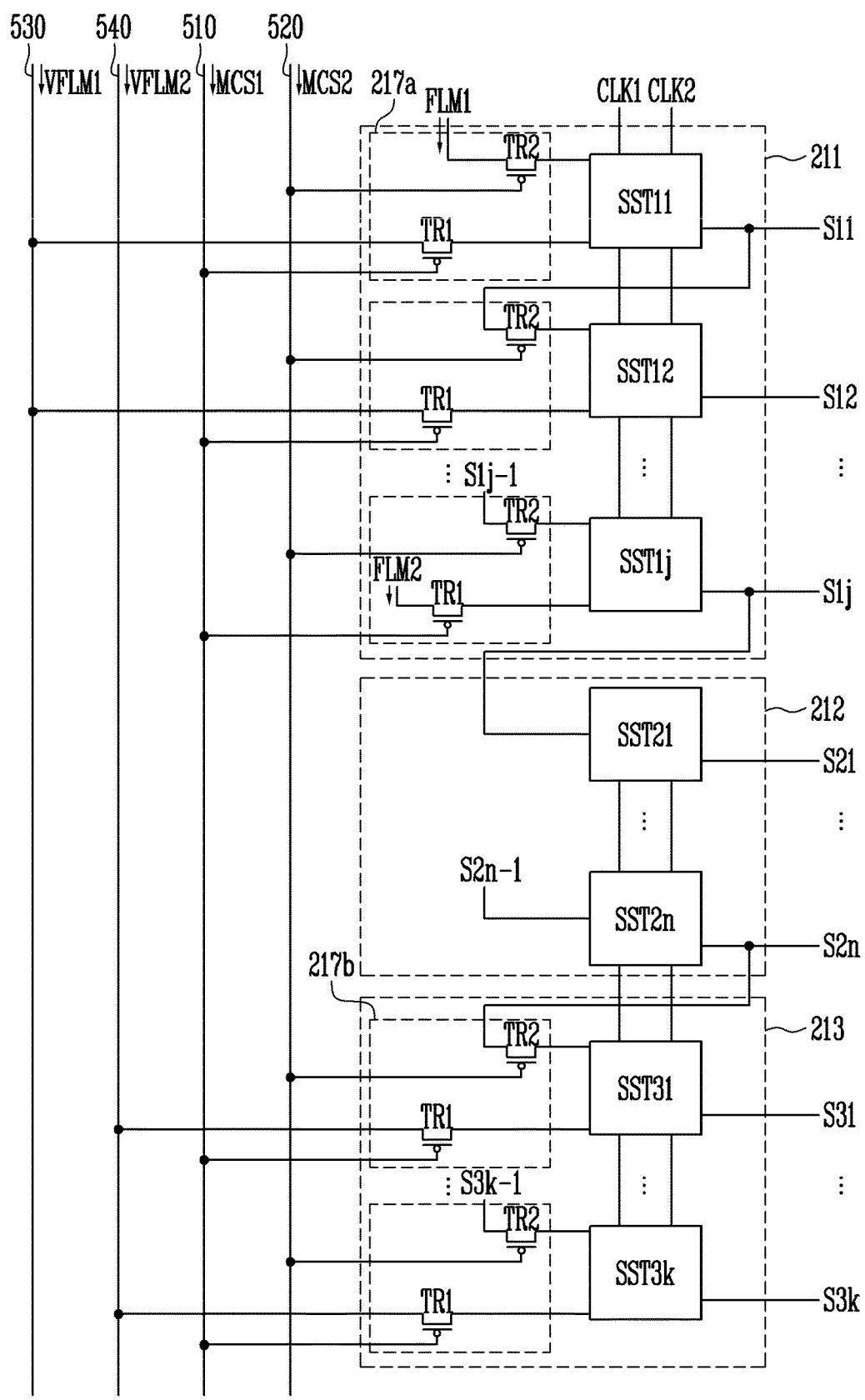
FIG. 5 is a diagram illustrating the configuration of scan drivers shown in FIG. 3, according to some example embodiments of the present invention.

FIG. 5 is a diagram illustrating the configuration of the first, second, and third scan drivers shown in FIG. 3. For convenience of explanation, FIG. 5 illustrates three scan stages SST11, SST12, and SST1$j$ included in the first scan driver 211, two scan stages SST21 and SST2$n$ included in the second scan driver 212, and two scan stages SST31 and SST3$k$ included in the third scan driver 213. Referring to FIG. 5, the first scan driver 211 may include a plurality of scan stages SST11 to SST1$j$ and first multiplexers 217$a$. The scan stages SST11 to SST1$j$ of the first scan driver 211 may be connected to ends of the first scan lines S11 to S1$j$ and supply first scan signals to the first scan lines S11 to S1$j$, respectively. In addition, the first multiplexers 217$a$ may be connected to the scan stages SST11 to SST1$j$ of the first scan driver 211, respectively.

According to an embodiment, the first multiplexer 217$a$ may include a first switch TR1 and a second switch TR2. Each of the first switch TR1 and the second switch TR2 may be composed of a transistor. A gate electrode of the first switch TR1 may be connected to a first switch control line 510, a first electrode thereof may be connected to a first sub-start signal line 530 or a second start signal line 540, and a second electrode thereof may be connected to the scan stages SST11 to SST1$j$.

For example, the first electrode of the first switch TR1 connected to each of the first to (j−1)th scan stages SST11 to SST1$j$−1 may be connected to the first sub-start signal line 530, and the first electrode of the first switch TR1 connected to the last scan stage SST1$j$ may be connected to the second start signal line 540.

A gate electrode of the second switch TR2 may be connected to a second switch control line 520, a first electrode thereof may be connected to a start signal line or a scan line connected to a scan stage of the previous stage, and a second electrode thereof may be connected to each of the scan stages SST11 to SST1$j$.

The scan stages SST11 to SST1$j$ of the first scan driver 211 may operate in response to the first switch control signal MCS1 supplied through the first switch control line 510 and the second switch control signal MCS2 supplied through the second switch control line 520. For example, when the display device 10 is driven in the second mode, the first switch TR1 may be turned off and the second switch TR2 may be turned on in response to the first switch control signal MCS1 and the second switch control signal MCS2.

In other words, the 1st first scan stage SST11 may supply a first scan signal to the 1st first scan line S11 in response to the first start signal FLM1, and the 2nd first scan stage SST12 may supply a first scan signal to the 2nd first scan line S12 in response to an output signal from the 1st first scan stage SST11 (the first scan signal supplied to the first scan line S11).

On the other hand, when the display device 10 is driven in the first mode, the first switch TR1 may be turned on and the second switch TR2 may be turned off by the first switch control signal MCS1 and the second switch control signal MCS2, respectively.

In other words, the scan stages SST11 to SST1j-1 of the first scan driver 211 may supply scan signals to the first scan lines S11 to S1j in response to the first sub-start signal VFLM1. The last scan stage SST1j may supply a scan signal in response to the second start signal FLM2. The scan stages SST11 to SST1j may have the same circuit structure.

Subsequently, the second scan driver 212 may include a plurality of scan stages SST21 to SST2n. Each of the stages SST21 to SST2n of the second scan driver 212 may be connected to one end of each of the second scan lines S21 to S2n and supply a second scan signal to each of the second scan lines S21 to S2n.

Each of the scan stages SST21 to SST2n may receive an output signal (i.e., scan signal) of the previous scan stage. For example, the first scan stage SST21 may receive an output signal from the last scan stage SST1j of the first scan driver 211 and the last scan stage SST2n may receive an output signal from an (n-1)th scan stage SST2n-1.

The scan stages SST21 to SST2n may be composed of the same circuit. In addition, the scan stages SST11 to SST1j of the first scan driver 211 and the scan stages SST21 to SST2n of the second scan driver 212 may be composed of the same circuits.

The third scan driver 213 may include a plurality of scan stages SST31 to SST3k and second multiplexers 217b. Each of the scan stages SST31 to SST3k of the third scan driver 213 may be connected to one end of each of the third scan lines S31 to S3k and supply a third scan signal to each of the third scan lines S31 to S3k.

In addition, each of the second multiplexers 217b may be connected to each of the scan stages SST31 to SST3k of the third scan driver 213. The second multiplexer 217b may include the first switch TR1 and the second switch TR2. Each of the first switch TR1 and the second switch TR2 may include a transistor.

A gate electrode of the first switch TR1 may be connected to the first switch control line 510, a first electrode thereof may be connected to the second sub-start signal line 540, and a second electrode thereof may be connected to each of the scan stages SST31 to SST3k.

A gate electrode of the second switch TR2 may be connected to the second switch control line 520, a first electrode thereof may be connected to a scan line connected to the previous scan stage, and a second electrode thereof may be connected to each of the scan stages SST31 to SST3k.

The scan stages SST31 to SST3k of the third scan driver 213 may operate in response to the first switch control signal MCS1 supplied through the first switch control line 510 and the second switch control signal MCS2 supplied through the second switch control line 520.

For example, when the display device 10 is driven in the second mode, the first switch TR1 may be turned off and the second switch TR2 may be turned on in response to the first switch control signal MCS1 and the second switch control signal MCS2, respectively.

In other words, the 1st third scan stage SST31 may supply a third scan signal to the 1st third scan line S31 in response to a scan signal output from the last second scan stage SST2n. The 2nd third scan stage SST32 may supply a third scan signal to the 2nd third scan line S32 in response to an output signal from the 1st third scan stage SST31 (the third scan signal supplied to the third scan line S31).

On the other hand, when the display device 10 is driven in the first mode, the first switch TR1 may be turned on and the second switch TR2 may be turned off by the first switch control signal MCS1 and the second switch control signal MCS2, respectively. In other words, the scan stages SST31 to SST3j of the third scan driver 213 may supply scan signals to the third scan lines S31 to S3j in response to the second sub-start signal VFLM2.

The scan stages SST31 to SST3k may have the same circuit structure. In addition, the scan stages SST11 to SST1j of the first scan driver 211 and the scan stages SST31 to SST3k of the third scan driver 213 may have the same circuit structure.

According to an embodiment, as shown in FIG. 5, the switches TR1 and TR2 may be composed of PMOS transistors. However, according to another embodiment, the switches TR1 and TR2 may be composed of NMOS transistors. Each of the scan stages SST11 to SST1j, SST21 to SST2n, and SST31 to SST3k may receive the first clock signal CLK1 and the second clock signal CLK2.

The first clock signal CLK1 and the second clock signal CLK2 may have the same cycle and non-overlapping phases. For example, when the display device 10 is driven in the second mode, if a scan signal is supplied to a single scan line during a 1 horizontal period 1H, each of the clock signals CLK1 and CLK2 may have a cycle corresponding to 2H. In addition, the clock signals CLK1 and CLK2 may be supplied during different horizontal periods.

Figure 6:
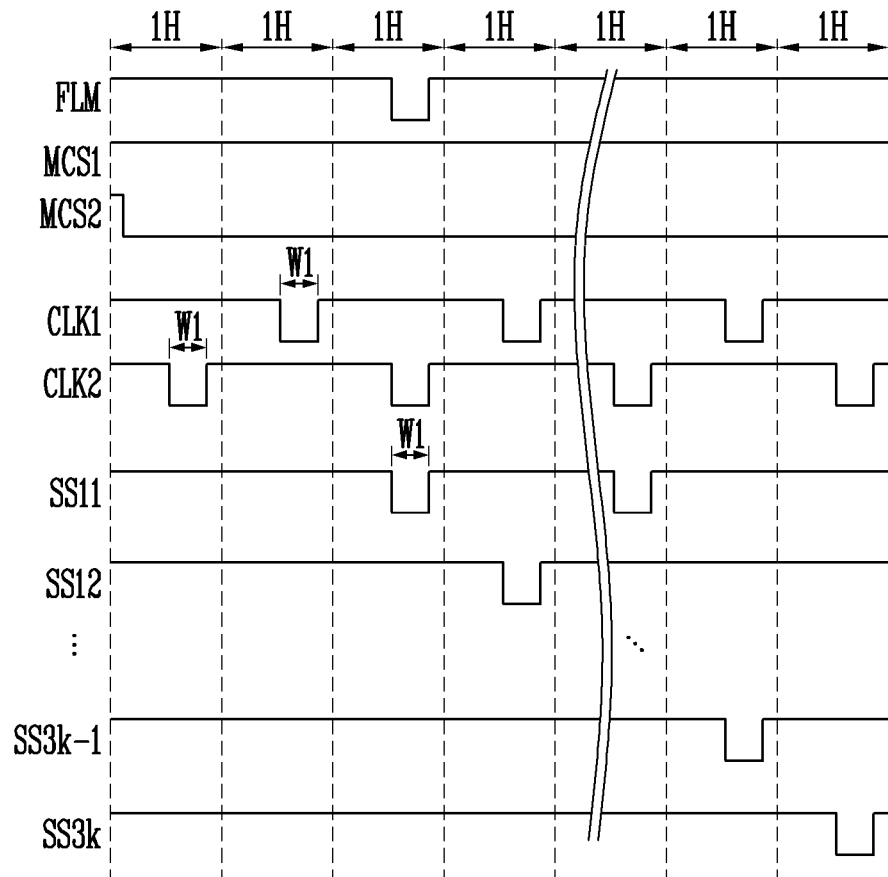
FIG. 6 is a waveform view illustrating a method of driving a scan stage shown in FIG. 5 when a display device is driven in a second mode, according to some example embodiments of the present invention.

FIG. 6 is a waveform view illustrating a method of driving the scan stages shown in FIG. 5 when the display device 10 is driven in the second mode. Referring to FIG. 6, the first clock signal CLK1 and the second clock signal CLK2 each may have a cycle of two horizontal periods 2H and be supplied during horizontal periods. In other words, the second clock signal CLK2 may be set to be shifted by half the cycle (i.e., one horizontal period) of the first clock signal CLK1. Each of the first clock signal CLK1 and the second clock signal CLK2 may be set to a first width w1.

When the display device 10 is driven in the second mode, the first switch control signal MCS1 having a high level may be supplied to the first switch control signal line 510 and the second switch control signal MCS2 having a low level may be supplied to the second switch control signal line 520. Therefore, all first switches TR1 of the multiplexers 217a may be turned off and all second switches TR2 thereof may be turned on.

In other words, the first start signal FLM1 may be supplied to the first scan stage SST11 of the first scan driver 211, and output signals from the previous scan stages may be supplied to the remaining scan stages (SST12 to SST1j, SST21 to SST2n, and SST31 to SST3k).

The first scan stage SST11 may receive the first start signal FLM1 and output the second clock signal CLK2 overlapping with the first start signal FLM1 as a scan signal SS11 through the 1st first scan line S11. Subsequently, the second scan stage SST12 may receive the scan signal SS11 output from the first scan stage SST11.

The second scan stage SST12 may output the first clock signal CLK1 adjacent to the scan signal SS11 as a scan signal SS12 through the 2nd first scan line S12. According to an embodiment, the scan stages SST11 to SST1j, SST21 to SST2n, and SST31 to SST3k may repeat the above-described processes and sequentially output scan signals to the remaining scan lines (S13 to S1j, S21 to S2n, and S31 to S3k) until a third scan signal SS3k is output from the last scan stage SST3k.

Because each of the first clock signal CLK1 and the second clock signal CLK2 has the first width w1, each of the scan signals SS11 to SS3k may have the first width w1. In other words, when the display device 10 is driven in the second mode, the first clock signal CLK1 and the second clock signal CLK2 supplied to the scan stages SST11 to SST1j, SST21 to SST2n, and SST31 to SST3k and the scan signals SS11 to SS3k output from the scan stages SST11 to SST1j, SST21 to SST2n, and SST31 to SST3k may have the first width w1.

According to some example embodiments, the scan signals output from the odd scan stages SST11, SST13, SST15, . . . , among the scan stages SST11 to SST1j, SST21 to SST2n, and SST31 to SST3k, may overlap with the second clock signal CLK2. In addition, the scan signals output from the even scan stages SST12, SST14, SST16, . . . may overlap with the first clock signal CLK1.

However, example embodiments of the present invention are not limited thereto. According to the configurations of the scan stages SST11 to SST1j, SST21 to SST2n, and SST31 to SST3k, the scan signals output from the odd scan stages SST11, SST13, SST15, . . . may overlap with the first clock signal CLK1, and the scan signals output from the even scan stages SST12, SST14, SST16, . . . may overlap with the second clock signal CLK2.

Figure 7:
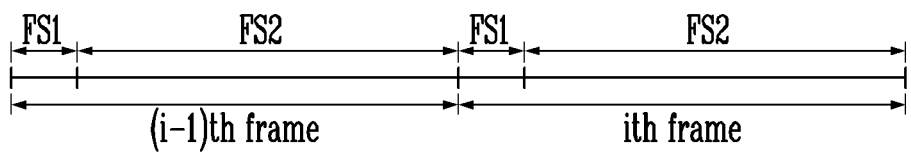
FIG. 7 is a diagram illustrating an image displaying method, according to some example embodiments of the present invention.

FIG. 7 is a diagram illustrating an image displaying method according to an embodiment. Referring to FIG. 7, each frame may include a first sub-frame period FS1 and a second sub-frame period FS2. An image may not be displayed or an image corresponding to dummy data may be displayed during the first sub-frame period FS1. An effective image corresponding to valid data may be displayed during the second sub-frame period FS2. When the display device 10 is driven in the second mode, scan signals may be supplied to the pixels PXL1, PXL2, and PXL3 through the 1st first scan line S11 to the last third scan line S3k during the second sub-frame period FS2.

When the display device 10 is driven in the first mode, scan signals may be supplied to the second pixels PXL2 through the 1st to the last second scan lines S21 to S2n during the second sub-frame period FS2. In addition, during the first sub-frame period FS1, the scan signals may be supplied to the first pixels PXL1 through the 1st to last first scan lines S11 to S1j, and the scan signals may be supplied to the third pixels PXL3 through the 1st to last third scan lines S31 to S3k.

When the scan signals are supplied to the first pixels PXL1 through the 1st to the last first scan lines S11 to S1j, the data signals supplied to the pixels PXL2 connected to a 1st second scan line during the previous frame may be supplied to the first pixels PXL1.

For example, during the first sub-frame FS1 period of an ith frame, the data signals supplied to the first pixels PXL1 supplied to the pixels PXL2 connected to a 1st second scan line of an (i−1)th frame i−1th frame.

In addition, when scan signals are supplied to the third pixels PXL3 through the 1st to last third scan lines S31 to S3k, the data signals supplied to the pixels PXL2 connected to the last second scan line S2n during the previous frame may be supplied to the third pixels PXL3. For example, during the first sub-frame FS1 period of the ith frame, the data signals supplied to the pixels PXL2 connected to the last second scan line S2n of the (i−1)th frame i−1th frame may be supplied to the third pixels PXL3.

As illustrated in FIG. 7, the first sub-frame periods FS1 and the second sub-frame periods FS2 may be sequentially arranged in a single frame. However, example embodiments of the present invention are not limited thereto. The order in which the first sub-frame period FS1 and the second sub-frame period FS2 are arranged may be changed.

Figure 8:
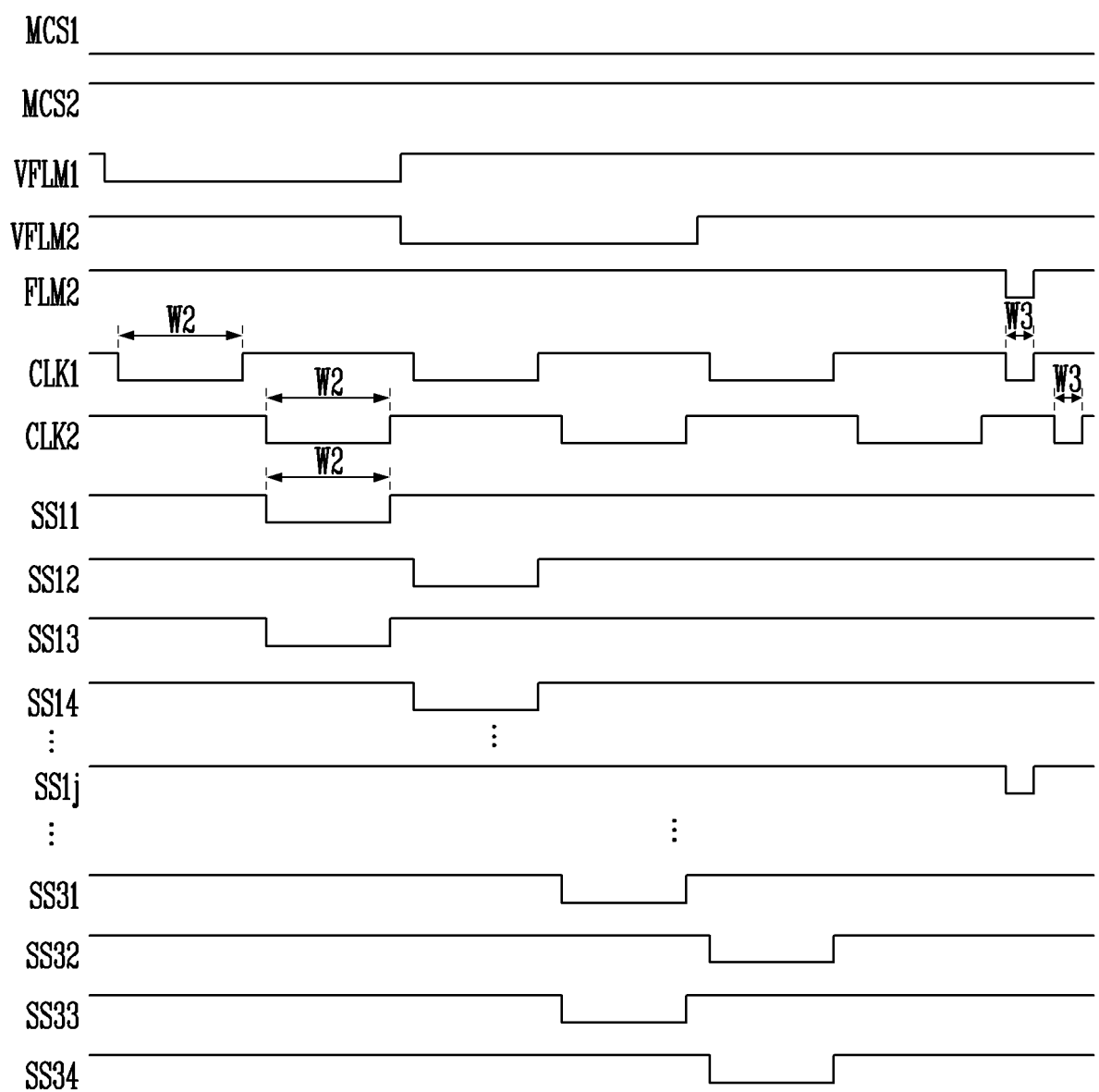
FIG. 8 is a waveform view illustrating a method of driving a scan stage shown in FIG. 5 when a display device is driven in a first mode, according to some example embodiments of the present invention.

FIG. 8 is a waveform view illustrating a method of driving scan stages shown in FIG. 5 when the display device 10 is driven in the first mode. Referring to FIG. 8, the first clock signal CLK1 and the second clock signal CLK2 may have a longer cycle than two horizontal periods 2H and may not overlap with each other.

For example, the first clock signal CLK1 and the second clock signal CLK2 may have a cycle of six horizontal periods 6H, and the second clock signal CLK2 may be shifted by half the cycle (i.e., three horizontal periods) of the first clock signal CLK1. The first clock signal CLK1 and the second clock signal CLK2 supplied to the first scan stages and the third scan stages when the display device 10 is driven in the first mode may be set to a second width w2 greater than the first width w1.

When the display device 10 is driven in the first mode, the first switch control signal MCS1 having a low level may be supplied to the first switch control signal line 510 and the second switch control signal MCS2 having a high level may be supplied to the second switch control signal line 520. Therefore, all first switches TR1 of the multiplexers 217a may be turned on and all second switches TR2 thereof may be turned off. The first sub-start signal VFLM1 and the second sub-start signal VFLM2 may be sequentially supplied when the first control signal MCS1 having a low level is supplied.

Each of the first sub-start signal VFLM1 and the second sub-start signal VFLM2 may maintain a low level during the cycle of each of the first clock signal CLK1 and the second clock signal CLK2 or more. For example, each of the first sub-start signal VFLM1 and the second sub-start signal VFLM2 may maintain the low level during six horizontal periods or more.

First, the first sub-start signal VFLM1 may be supplied to the scan stages SST11 to SST1j of the first scan driver 211 at the same time. When the first sub-start signal VFLM1 is supplied to the scan stages SST11 to SST1j of the first scan driver 211, the odd scan stages SST11, SST13, SST15, . . . may output the second clock signal CLK2 overlapping with the first sub-start signal VFLM1 as a scan signal.

Therefore, as shown in FIG. 8, the first scan signal SS11 and a third scan signal SS13 may be supplied at the same time. When scan signals are supplied to the scan lines S11, S13, S15, . . . corresponding to odd horizontal lines, dummy data may be supplied to the first pixel area AA1 from the data driver 230.

The dummy data supplied to the first pixel area AA1 may be data previously supplied to the pixels PXL2 located in the first horizontal line of the second pixel area AA2 during the previous frame. Subsequently, the even scan stages SST12, SST14, SST16, . . . may supply the first clock signal CLK1 adjacent to the first sub-start signal VFLM1 as a scan signal. Therefore, as shown in FIG. 8, the second scan signal SS12 and a fourth scan signal SS14 may be supplied at the same time.

When scan signals are supplied to the scan lines S12, S14, S16, . . . corresponding to even horizontal lines, dummy data from the data driver 230 may be supplied to the first pixel area AA1. The dummy data may be the same as the dummy data supplied to the pixels PXL1 located in the odd horizontal lines. In other words, the data supplied to the pixels PXL2 located in the first horizontal line of the second pixel area AA2 during the previous frame may be supplied to the pixels PXL1 located in the even horizontal lines.

After the first sub-start signal VFLM1 is supplied, the second sub-start signal VFLM2 may be supplied to the scan stages SST31 to SST3$k$ of the third scan driver 213 at the same time. When the second sub-start signal VFLM2 is supplied to the scan stages SST31 to SST3$k$ of the third scan driver 213, the odd scan stages SST31, SST33, SST35, . . . may output the second clock signal CLK2 overlapping with the second sub-start signal VFLM2 as a scan signal.

Therefore, as illustrated in FIG. 8, a first scan signal SS31 and a third scan signal SS33 may be supplied at the same time. When scan signals are supplied to the scan lines S31, S33, S35, . . . corresponding to odd horizontal lines, dummy data may be supplied from the data driver 230 to the third pixel area AA3. The dummy data supplied to the third pixel area AA3 may be data previously supplied to the pixels PXL2 located in the last horizontal line of the second pixel area AA2 during the previous frame.

Subsequently, each of the even scan stages SST32, SST34, SST36, . . . may output the first clock signal CLK1 adjacent to the second sub-start signal VFLM2 as a scan signal. Therefore, as shown in FIG. 8, a second scan signal SS32 and a fourth scan signal SS34 may be supplied may be supplied at the same time.

When scan signals corresponding to the scan lines S32, S34, S36, . . . corresponding to even horizontal lines are supplied, the dummy data may be supplied from the data driver 230 to the third pixel area AA3. The dummy data may be the same as the dummy data supplied to the pixels PXL3 located in the odd horizontal lines.

In other words, the data supplied to the pixels PXL2 located in the last horizontal line of the second pixel area AA2 during the previous frame may be supplied to the pixels PXL3 located in the even horizontal lines.

When the display device 10 is driven in the first mode, the first clock signal CLK1 and the second clock signal CLK2 supplied to the first scan stages SST11 to SST1$j$ and the third scan stages SST31 to SST3$k$ may have the second width w2. Therefore, each of the first scan signals SS11 to SS1$j$-1 and the third scan signals SS31 to SS3$k$ may also have the second width w2.

In other words, by controlling the width of each of the first scan signals SS11 to SS1$j$-1 and the third scan signals SS31 to SS3$k$, brightness of a dummy image displayed on the first pixel area AA1 and the third pixel area AA3 may be controlled.

After the third scan signals SS31 to SS3$k$ are output, the width of each of the first and second clock signals CLK1 and CLK2 may change from the second width w2 to a third width w3 smaller than the second width w2. Therefore, the second scan signals may have the third width w3. The second start signal FLM2, not the first sub-start signal VFLM1, may be supplied to the last stage circuit SST1$j$ of the first scan driver 211. The last stage circuit SST1$j$ of the first scan driver 211 may generate and output the scan signal S1$j$ corresponding to the second start signal FLM2, and the first stage circuit SST21 of the second scan driver 212 may generate a scan signal corresponding to the scan signal S1$j$ output from the last stage circuit SST1$j$ of the first scan driver 211.

The second start signal FLM2 may be output after the scan signals are supplied to the third scan lines S31 to S3$k$. In other words, the second scan driver 212 may start to be driven after each of the first and third scan drivers 211 and 213 stops being driven. The second scan driver 212 may sequentially supply scan signals to the second scan lines S21 to S2$n$.

As described above, when the display device 10 is driven in the first mode, the first sub-start signal VFLM1 and the second sub-start signal VFLM2 may not overlap with each other so as to supply different dummy data to the first pixel area AA1 and the third pixel area AA3, respectively. However, the invention is not limited thereto.

When the display device 10 is driven in the first mode, because the first pixel area AA1 and the third pixel area AA3 are not viewed by the user by the frame, the same dummy data may be supplied thereto. The first sub-start signal VFLM1 and the second sub-start signal VFLM2 may be supplied at the same time.

Figure 9:
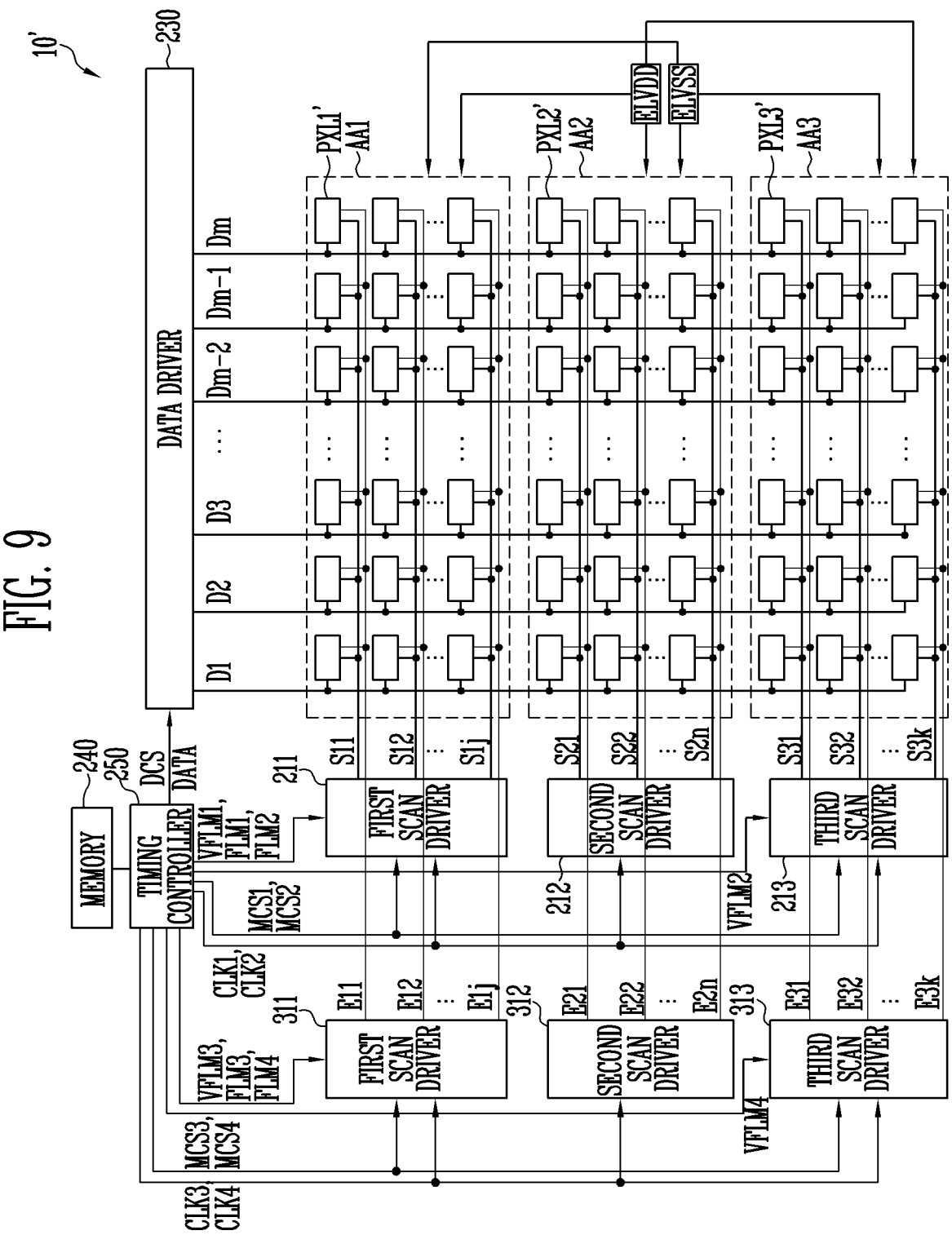
FIG. 9 is a detailed view illustrating the configuration of a display device, according to some example embodiments of the present invention.

FIG. 9 is a detailed diagram illustrating the configuration of a display device 10' according to some example embodiments of the present invention. The display device 10' according to another embodiment will be described with reference to FIG. 9. Some repetitive description of the same components of the display device 10' as those of the display device 10 shown in FIG. 3 will be omitted, and different components of the display device 10' from those of the display device 10 shown in FIG. 3 will be omitted.

Referring to FIG. 9, the display device 10' may include pixels PXL1', PXL2', and PXL3' and a display driver. The display driver may include the first scan driver 211, the second scan driver 212, the third scan driver 213, a first emission driver 311, a second emission driver 312, a third emission driver 313, the data driver 230, the memory 240 and the timing controller 250. The first pixels PXL1' may be located in the first pixel area AA1 divided by the first scan lines S11 to S1$j$, first emission lines E11 to E1$j$ and the data lines D1 to Dm. The second pixels PXL2' may be located in the second pixel area AA2 divided by the second scan lines S21 to S2$n$, second emission lines E21 to E2$n$ and the data lines D1 to Dm. The third pixels PXL3' may be located in the third pixel area AA3 divided by the third scan lines S31 to S3$k$, third emission lines E31 to E3$k$ and the data lines D1 to Dm. The first emission driver 311 may supply first emission signals to the first emission lines E11 to E1$j$ in response to first emission control signals (CLK3, CLK4, MCS3, MCS4, VFLM3, FLM3, and FLM4) from the timing controller 250.

For example, in the second mode, the first emission driver 311 may sequentially supply the first emission signals to the first emission lines E11 to E1$j$. In addition, in the first mode, the first emission driver 311 may simultaneously supply the first emission signals to the first emission lines E11 to E1$j$. For example, the first emission driver 311 may supply the first emission signals to the odd first emission lines E11, E13, E15, . . . and the first emission signals to the even first emission lines E12, E14, E16, . . . .

These emission signals may be applied to control emission time of the first pixels PXL1'. The first emission signal may be set to have a greater width than the scan signal. The second emission driver 312 may supply second emission signals to the second emission lines E21 to E2$n$ in response to second emission control signals (CLK3 and CLK4) from the timing controller 250.

For example, in the first and second modes, the second emission driver 312 may sequentially supply the second emission signals to the second emission lines E21 to E2$n$. The second emission signals may be applied to control emission time of the second pixels PXL2'. The second emission signal may be set to a greater width than the scan signal. The third emission driver 313 may supply third emission signals to the third emission lines E31 to E3k.

For example, in the second mode, the third emission driver 313 may sequentially supply emission signals to the third emission lines E31 to E3k in response to third emission control signals (CLK3, CLK4, MCS3, MCS4, and VFLM4) from the timing controller 250.

In addition, in the first mode, the third emission driver 313 may simultaneously supply the third emission signals to the plurality of third emission lines E31 to E3k. For example, the third emission driver 313 may simultaneously supply the third emission signals to the odd third emission lines E31, E33, E35, . . . and simultaneously the third emission signals to even third emission lines E32, E34, E36, . . . .

The third emission signals may be applied to control emission time of the third pixels PXL3'. The emission signal may be set to a greater width than the scan signal. The first to third emission signals may be set to a gate off voltage (for example, a high voltage) so that transistors included in the pixels PXL1', PXL2', and PXL3' may be turned off. The scan signals may be set to a gate on voltage (e.g., a low voltage) so that transistors included in the pixels PXL1', PXL2', and PXL3' may be turned on.

When the display device 10 is driven in the first mode, the first pixels PXL1' located in an odd horizontal line may emit light at the same time, and the first pixels PXL1' located in an even horizontal line may emit light at the same time.

Subsequently, the third pixels PXL3' located in an odd horizontal line may emit light at the same time and the third pixels PXL3' located in an even horizontal line may emit light at the same time. Subsequently, the second pixels PXL2' may sequentially emit light in units of horizontal lines.

On the other hand, when the display device 10 is driven in the second mode, the first pixels PXL1' may start emitting light in units of horizontal lines, the second pixels PXL2' may then start emitting light in units of horizontal lines, and lastly, the third pixels PXL3' may start emitting light in units of horizontal lines.

The timing controller 250 may supply emission control signals generated on the basis of externally supplied timing signals to the emission drivers 311, 312, and 313. The first emission control signals may include switch control signals MCS3 and MCS4, clock signals CLK3 and CLK4, start signals FLM3 and FLM4 and a third sub-start signal VFLM3.

The third start signal FLM3 and the third sub-start signal VFLM3 may be applied to control supply timing of the first emission signals, and the clock signals CLK3 and CLK4 may be used to shift the third start signal FLM3. In addition, the switch control signals MCS3 and MCS4 may be used to determine an output signal of a multiplexer to be described below.

The second emission control signals may include the clock signals CLK3 and CLK4. The clock signals CLK3 and CLK4 may be used to shift a last emission signal E1j of the first emission driver 311. The third emission control signals may include the switch control signals MCS3 and MCS4, the clock signals CLK3 and CLK4 and a fourth sub-start signal VFLM4.

The fourth sub-start signal VFLM4 may be applied to control supply timing of the third emission signals, and the switch control signals MCS3 and MCS4 may be applied to determine an output signal of a multiplexer to be described below.

Figure 10:
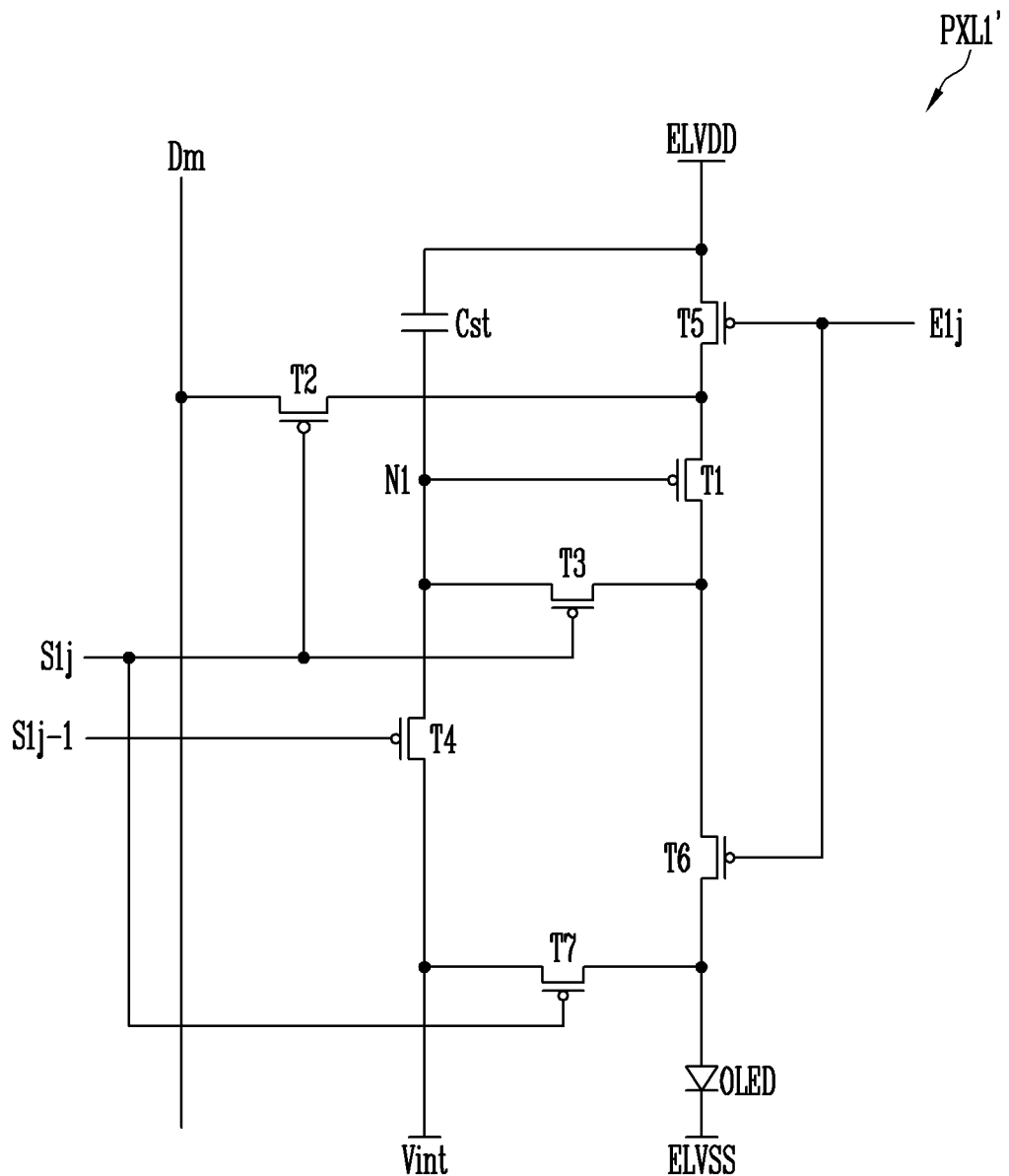
FIG. 10 is a diagram illustrating an embodiment of a first pixel shown in FIG. 9, according to some example embodiments of the present invention.

FIG. 10 is a diagram illustrating one embodiment of the first pixel PXL1' shown in FIG. 9. For convenience of explanation, as illustrated in FIG. 10, the first pixel PXL1' may be connected to the jth first scan line S1j and the mth data line Dm. Referring to FIG. 10, according to an embodiment, the first pixel PXL1' may include the organic light emitting diode OLED, first to seventh transistors T1 to T7, and the storage capacitor Cst.

An anode of the organic light emitting diode OLED may be connected to the first transistor T1 through a sixth transistor T6, and a cathode thereof may be connected to the second power supply ELVSS. The organic light emitting diode OLED may generate light of a predetermined brightness in response to the amount of current supplied from the first transistor T1.

The first power supply ELVDD may be set to a higher voltage than the second power supply ELVSS so that current may flow through the organic light emitting diode OLED.

The seventh transistor T7 may be connected between an initialization power supply Vint and the anode of the organic light emitting diode OLED. In addition, a gate electrode of the seventh transistor T7 may be connected to the jth first scan line S1j. The seventh transistor T7 may be turned on when a scan signal is supplied to the jth first scan line S1j, and may supply a voltage of the initialization power supply Vint to the anode of the organic light emitting diode OLED. The initialization power supply Vint may be set to a lower voltage than the data signal.

The sixth transistor T6 may be connected between the first transistor T1 and the organic light emitting diode OLED. A gate electrode of the sixth transistor T6 may be connected to the jth first emission line E1j. The sixth transistor T6 may be turned off when an emission control signal is supplied to the jth first emission line E1j, and otherwise turned on.

A fifth transistor T5 may be connected between the first power supply ELVDD and the first transistor T1. In addition, a gate electrode of the fifth transistor T5 may be connected to the jth first emission line E1j. The fifth transistor T5 may be turned off when the emission control signal is supplied to the jth first emission line E1j, and otherwise, turned on.

A first electrode of the first transistor T1 (driving transistor) may be connected to the first power supply ELVDD through the fifth transistor T5 and a second electrode thereof may be connected to the anode of the organic light emitting diode OLED through the sixth transistor T6. A gate electrode of the first transistor T1 may be connected to a first node N1. The first transistor T1 may control the amount of current flowing from the first power supply ELVDD through the organic light emitting diode OLED to the second power supply ELVSS in response to a voltage of the first node N1.

A third transistor T3 may be connected to the second electrode of the first transistor T1 and the first node N1. A gate electrode of the third transistor T3 may be connected to the jth first scan line S1j. The third transistor T3 may be turned on when the scan signal is supplied to the jth first scan line S1j, and electrically connect the second electrode of the first transistor T1 and the first node N1. Therefore, when the third transistor T3 is turned on, the first transistor T1 may be connected in a diode form.

The fourth transistor T4 may be connected between the first node N1 and the initialization power supply Vint. In addition, a gate electrode of the fourth transistor T4 may be connected to a (j−1)th first scan line S1j−1. The fourth transistor T4 may be turned on when a scan signal is supplied to the (j−1)th first scan line S1j−1, and supply the voltage of the initialization power supply Vint to the first node N1.

A second transistor T2 may be connected between the mth data line Dm and the first electrode of the first transistor T1.

In addition, a gate electrode of the second transistor T2 may be connected to the jth first scan line S1j. The second transistor T2 may be turned on when the scan signal is supplied to the jth first scan line S1j, and electrically connect the mth data line Dm to the first electrode of the first transistor T1.

The storage capacitor Cst may be connected between the first power supply ELVDD and the first node N1. The storage capacitor Cst may store a voltage corresponding to the data signal and a threshold voltage of the first transistor T1.

Although the pixel structure shown in FIG. 10 corresponds to an embodiment of the invention, the first pixel PXL1' is not limited thereto. The first pixel PXL1' may have any one of various circuit configurations currently known in the art as a circuit configuration thereof so that the first pixel PXL1' may supply current to the organic light emitting diode OLED.

The first power supply ELVDD may be a high-potential power supply and the second power supply ELVSS may be a low-potential power supply. For example, the first power supply ELVDD may be set to a positive voltage and the second power supply ELVSS may be set to a negative voltage or a ground voltage.

Each of the second pixel PXL2' and the third pixel PXL3' to be described below may be composed of the same circuit as the first pixel PXL1'. Therefore, a detailed description of the second pixel PXL2' and the third pixel PXL3' will be omitted.

Because the configurations and the functions of the scan drivers shown in FIG. 9 are the same as those of the above-described scan drives, configurations and functions of emission drivers will be described below.

Figure 11:
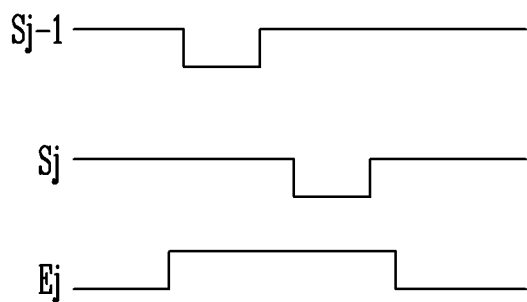
FIG. 11 is a diagram illustrating an embodiment of a method of driving a pixel shown in FIG. 10, according to some example embodiments of the present invention.

FIG. 11 is a diagram illustrating a method of driving the pixel PXL1' shown in FIG. 10. Referring to FIG. 11, an emission signal may be supplied to an emission line Ej. When the emission signal is supplied to the emission line Ej, the fifth transistor T5 and the sixth transistor T6 may be turned off. Thus, the pixel PXL1' may be set to a non-emission state.

Subsequently, a scan signal may be supplied to a (j−1)th scan line Sj−1 to turn on the fourth transistor T4. When the fourth transistor T4 is turned on, the voltage of the initialization power supply Vint may be supplied to the first node N1, so that the first node N1 may be initialized to the voltage of the initialization power supply Vint.

After the first node N1 is initialized to the voltage of the initialization power supply Vint, a scan signal may be supplied to a jth scan line Sj. When the scan signal is supplied to the jth scan line Sj, the second transistor T2, the third transistor T3 and the seventh transistor T7 may be turned on.

When the seventh transistor T7 is turned on, the voltage of the initialization power supply Vint may be supplied to the anode electrode of the organic light emitting diode OLED. Thus, a parasitic capacitor formed parasitically formed in the organic light emitting diode OLED may be discharged, so that black expression capability may be improved.

For example, the parasitic capacitor of the organic light emitting diode OLED may be charged with a predetermined voltage in response to current supplied during the previous frame. When a black grayscale is displayed during the current frame, the organic light emitting diode OLED may necessarily maintain the non-emission state. When the parasitic capacitor of the organic light emitting diode OLED remains charged, the organic light emitting diode OLED may slightly emit light by a leakage current of the first transistor T1.

On the other hand, when the parasitic capacitor of the organic light emitting diode OLED is discharged, the leakage current of the first transistor T1 may precharge the parasitic capacitor of the organic light emitting diode OLED, and therefore, the organic light emitting diode OLED may maintain the non-emission state.

When the third transistor T3 is turned on, the first transistor T1 may be connected in a diode form. When the second transistor T2 is turned on, a data signal from the data line Dm may be supplied to the first electrode of the first transistor T1. Since the first node N1 is initialized to the voltage of the initialization power supply Vint lower than the data signal, the first transistor T1 may be turned on. When the first transistor T1 is turned on, a voltage obtained by subtracting the threshold voltage of the first transistor T1 from the data signal may be supplied to the first node N1. The storage capacitor Cst may store a voltage corresponding to the data signal applied to the first node N1 and the threshold voltage of the first transistor T1.

After the voltage corresponding to the data signal applied to the first node N1 and the threshold voltage of the first transistor T1 is stored in the storage capacitor Cst, supply of the emission signal to the emission line Ej may be stopped. When the supply of the emission signal to the emission line Ej is stopped, the fifth transistor T5 and the sixth transistor T6 may be turned on. As a result, a current path may be formed from the first power supply ELVDD to the second power supply ELVSS through the fifth transistor T5, the first transistor T1, the sixth transistor T6 and the organic light emitting diode OLED.

The first transistor T1 may control the amount of current flowing from the first power supply ELVDD through the organic light emitting diode OLED to the second power supply ELVSS in response to the voltage of the first node N1. The organic light emitting diode OLED may generate light of a predetermined brightness in response to the amount of current supplied from the first transistor T1.

The emission signal supplied to the emission line Ej may be supplied to overlap with at least one scan signal so that each of the pixels PXL1', PXL2', and PXL3' may be set to a non-emission state when the data signal is charged to each of the pixels PXL1', PXL2', and PXL3'. The timing at which the emission signal is supplied may be set by various methods currently known in the art.

Figure 12:
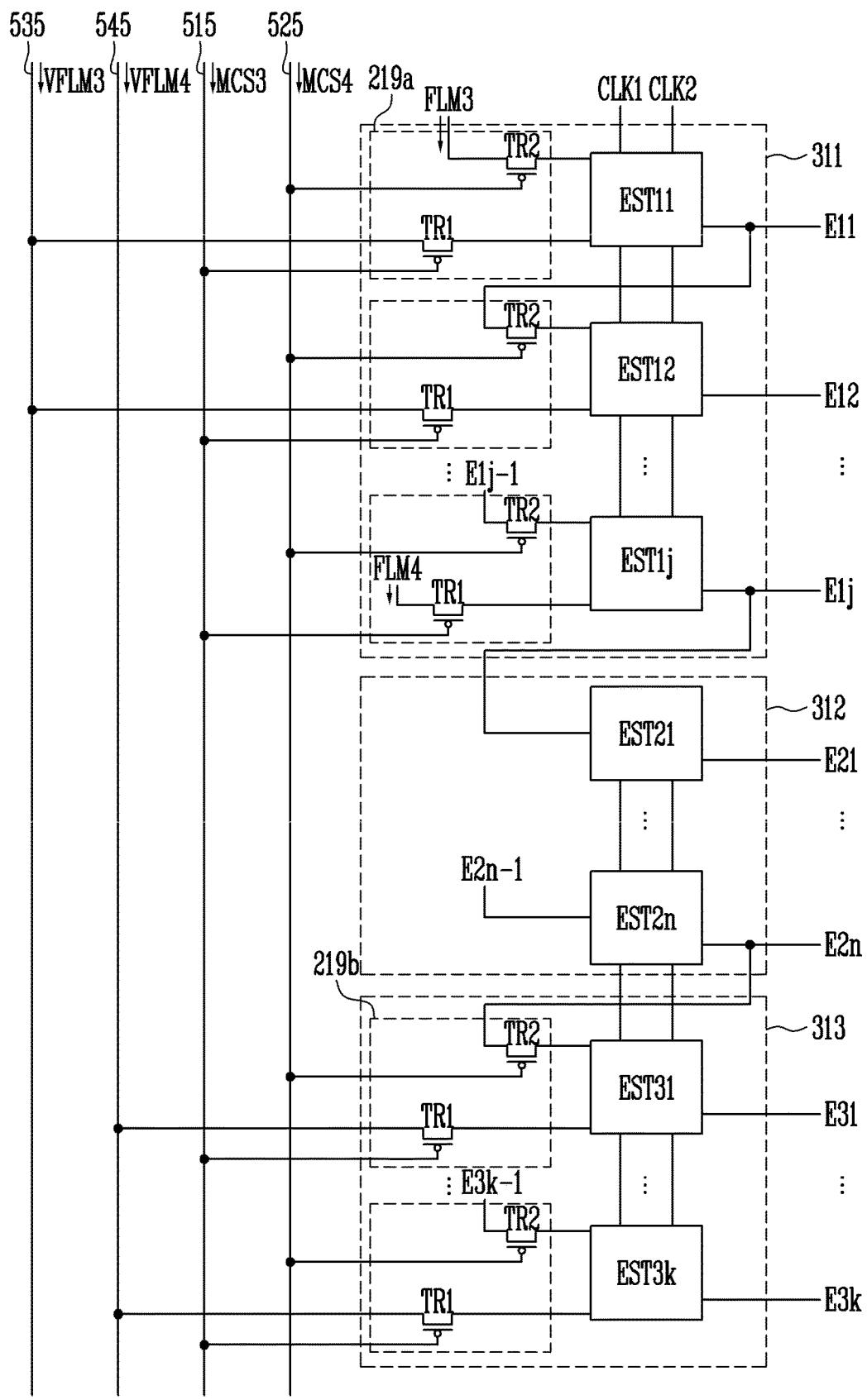
FIG. 12 is a diagram illustrating the configuration of emission drivers shown in FIG. 9, according to some example embodiments of the present invention.

FIG. 12 is a diagram illustrating the configuration of the emission drivers shown in FIG. 9 according to some example embodiments of the present invention. For convenience of explanation, FIG. 12 illustrates three first emission stages (EST11, EST12, and EST1j) included in the first emission driver 311, two second emission stages EST21 and EST2n included in the second emission driver 312, and third emission stages EST31 and EST3k included in the third emission driver 313.

Referring to FIG. 12, the first emission driver 311 may include a plurality of emission stages EST11 to EST1j and third multiplexers 219a. Each of the emission stages EST11 to EST1j of the first emission driver 311 may be connected to one end of each of the first emission lines E11 to E1j and supply a first emission signal to each of the first emission lines E11 to E1j.

In addition, each of the third multiplexers 219a may be connected to each of the emission stages EST11 to EST1j of the first emission driver 311. According to an embodiment, the third multiplexer 219a may include the first switch TR1 and the second switch TR2. Each of the first switch TR1 and the second switch TR2 may be composed of a transistor.

A gate electrode of the first switch TR1 may be connected to a third switch control line 515, a first electrode thereof may be connected to a third sub-start signal line 535 or a fourth start signal line, and a second electrode thereof may be connected to each of the emission stages EST11 to EST1j.

For example, the first electrode of the first switch TR1 connected to each of the first to (j−1)th emission stages EST11 to EST1j−1 may be connected to the third sub-start signal line 535, and the first electrode of the first switch TR1 connected to the last emission stage EST1j may be connected to the fourth start signal line.

A gate electrode of the second switch TR2 may be connected to a fourth switch control line 525, a first electrode thereof may be connected to a third start signal line or a first emission line connected to the previous emission stage, and a second electrode thereof may be connected to each of the emission stages EST11 to EST1j.

The emission stages EST11 to EST1j of the first emission driver 311 may operate in response to the third switch control signal MCS3 supplied through the third switch control line 515 and the fourth switch control signal MCS4 supplied through the fourth switch control line 525.

For example, when the display device 10 is driven in the second mode, the first switch TR1 may be turned off and the second switch TR2 may be turned on by the third switch control signal MCS3 and the fourth switch control signal MCS4.

In other words, the 1st first emission stage EST11 may supply a first emission signal to the 1st first emission line E11 in response to the third start signal FLM3. The 2nd first emission stage EST12 may supply a first emission signal to the 2nd first emission line E12 in response to an output signal from the 1st first emission stage EST11 (a first emission signal supplied to the first emission line E11).

On the other hand, when the display device 10 is driven in the first mode, the first switch TR1 may be turned on and the second switch TR2 may be turned off by the third switch control signal MCS3 and the fourth switch control signal MCS4, respectively.

In other words, the emission stages EST11 to EST1j−1 of the first emission driver 311 may supply emission signals to the first emission lines E11 to E1j in response to the third sub-start signal VFLM3. The last emission stage EST1j may supply an emission signal in response to the fourth start signal FLM4.

Each of the emission stages EST11 to EST1j may be composed of the same circuit. The second emission driver 312 may include a plurality of emission stages EST21 to EST2n.

The second emission stages EST21 to EST2n of the second emission driver 312 may be connected to respective ends of the second emission lines E21 to E2n and supply second emission signals to the second emission lines E21 to E2n, respectively.

Each of the second emission stages EST21 to EST2n may receive an output signal (i.e., emission signal) of the previous emission stage. For example, the 1st emission stage EST21 may receive an output signal from the last emission stage EST1j of the first emission driver 311, and the last emission stage EST2n may receive an output signal of an (n−1)th emission stage EST2n−1.

Each of the second emission stages EST21 to EST2n may have the same circuit. In addition, each of the emission stages EST11 to EST1j of the first emission driver 311 and the emission stages EST21 to EST2n of the second emission driver 312 may be composed of the same circuit.

The third emission driver 313 may include a plurality of emission stages EST31 to EST3k and fourth multiplexers 219b. The third emission stages EST31 to EST3k of the third emission driver 313 may be connected to respective ends of the third emission lines E31 to E3k and supply third emission signals to the third emission lines E31 to E3k, respectively.

In addition, each of the fourth multiplexers 219b may be connected to each of the emission stages EST31 to EST3k of the third emission driver 313. The fourth multiplexer 219b may include the first switch TR1 and the second switch TR2. Each of the first switch TR1 and the second switch TR2 may be composed of a transistor.

A gate electrode of the first switch TR1 may be connected to the third switch control line 515, a second electrode thereof may be connected to a fourth sub-start signal line 545, and a second electrode thereof may be connected to each of the emission stages EST31 to EST3k.

A gate electrode of the second switch TR2 may be connected to the fourth switch control line 525, a first electrode thereof may be connected to an emission line connected to the previous emission stage, and a second electrode thereof may be connected to each of the emission stages EST31 to EST3k.

The third emission stages EST31 to EST3k of the third emission driver 313 may operate in response to the third switch control signal MCS3 supplied through the third switch control line 515 and the fourth switch control signal MCS4 of the fourth switch control line 525. For example, when the display device 10 is driven in the second mode, the first switch TR1 may be turned on and the second switch TR2 may be turned on by the third switch control signal MCS3 and the fourth switch control signal MCS4.

In other words, the 1st third emission stage EST31 may supply a third emission signal to the 1st third emission line E31 in response to an emission signal output from last second emission stage EST2n. The 2nd third emission stage EST32 may supply a third emission signal to the 2nd third emission line E32 in response to an output signal (the third emission signal supplied to the 1st third emission line E31) from the 1st third emission stage EST31.

On the other hand, when the display device 10 is driven in the first mode, the first switch TR1 may be turned on and the second switch TR2 may be turned off by the third switch control signal MCS3 and the fourth switch control signal MCS4.

In other words, the emission stages EST31 to EST3j of the third emission driver 313 may supply the emission signals to the third emission lines E31 to E3j in response to the fourth sub-start signal VFLM4. Each of the emission stages EST31 to EST3k may be composed of the same circuit. In addition, each of the first emission stages EST11 to EST1j of the first emission driver 311 and the third emission stages EST31 to EST3k of the third emission driver 313 may include the same circuit.

As illustrated in FIG. 5, the switches TR1 and TR2 may include PMOS transistors. However, according to another embodiment, the switches TR1 and TR2 may include NMOS transistors. Each of the emission stages EST11 to EST1j, EST21 to EST2n, and EST31 to EST3k may receive the third clock signal CLK3 and the fourth clock signal CLK4.

The third clock signal CLK3 and the fourth clock signal CLK4 may have the same cycle and non-overlapping phases. The cycle of each of the third clock signal CLK3 and the fourth clock signal CLK4 may be longer than the cycle of each of the first clock signal CLK1 and the second clock signal CLK2. For example, each of the third clock signal CLK3 and the fourth clock signal CLK4 may have a cycle corresponding to 4 horizontal periods (4H).

FIG. 13 is a waveform view illustrating a method of driving the emission drivers shown in FIGS. 9 and 11 when the display device is driven in the first mode. Referring to FIG. 13, each of the third clock signal CLK3 and the fourth clock signal CLK4 may have a cycle corresponding to four horizontal periods 4H, and the fourth clock signal CLK4 may be set to a signal shifted from the third clock signal CLK3 by a half cycle (i.e., 2 horizontal periods). In other words, the third clock signal CLK3 and the fourth clock signal CLK4 may have longer cycles than the first clock signal CLK1 and the second clock signal CLK2.

When the display device 10 is driven in the first mode, the third switch control signal MCS3 having a low level may be supplied to the third switch control signal line 515 and the fourth switch control signal MCS4 having a high level may be supplied to the fourth switch control signal line 525.

Therefore, all first switches TR1 of the multiplexers 219a may be turned on and all second switches TR2 thereof may be turned off. When the third switch control signal MCS3 having a low level is supplied, the third sub-start signal VFLM3 and the fourth sub-start signal VFLM4 may be sequentially supplied.

Each of the third sub-start signal VFLM3 and the fourth sub-start signal VFLM4 may maintain a low level during the cycle of each of the third clock signal CLK3 and the fourth clock signal CLK4 or more. First, the third sub-start signal VFLM3 may be simultaneously supplied to the emission stages EST11 to EST1$j$ of the first emission driver 311.

When the third sub-start signal VFLM3 is supplied to the emission stages EST11 to EST1$j$ of the first emission driver 311, supply of emission signals EO1 output from the odd emission stages EST11, EST13, EST15, . . . may be stopped because the emission signals EO1 are synchronized with the fourth clock signal CLK4.

The scan drivers 211, 212, and 213 shown in FIG. 9 may have the same configurations as the scan drivers 211, 212, and 213 described shown in FIGS. 5 to 8. Therefore, when the display device 10 is driven in the first mode, scan signals may be supplied to the odd first scan lines S11, S13, S15, . . . at the same time, and dummy data may be supplied to the first pixel area AA1.

After the dummy data is supplied to the first pixel area AA1, the supply of the emission signals EO1 output from the odd emission stages EST11, EST13, EST15, . . . may be stopped. Therefore, the first pixels PXL1' located in the odd horizontal line may emit light at the same time in response to the dummy data.

Subsequently, supply of emission signals EE1 output from the even emission stages EST12, EST14, EST16, . . . may be stopped because the emission signals EE1 are synchronized with the third clock signal CLK3.

When the display device 10 is driven in the first mode, scan signals may be supplied to the even first scan lines S12, S14, S16, . . . at the same time, and the dummy data may be supplied to the first pixel area AA1. Subsequently, the supply of the emission signals EE1 output from the even emission stages EST12, EST14, EST16, . . . may be stopped. Therefore, the first pixels PXL1' located in the even horizontal line may emit light at the same time in response to the dummy data.

After the third sub-start signal VFLM3 is supplied, the fourth sub-start signal VFLM4 may be supplied to the emission stages EST31 to EST3$k$ of the third emission driver 313. When the fourth sub-start signal VFLM4 is supplied to the emission stages EST31 to EST3$k$ of the third emission driver 313, supply of emission signals EO3 output from the odd emission stages EST31, EST33, EST35, . . . may be stopped because the emission signals EO3 are synchronized with the fourth clock signal CLK4.

Because the scan drivers 211, 212, and 213 shown in FIG. 9 have the same configurations as the scan drivers 211, 212, and 213 described above with reference to FIGS. 5 to 8, when the display device 10 is driven in the first mode, scan signals may be supplied to the odd third scan lines S31, S33, S35, . . . at the same time, and the dummy data may be supplied to the third pixel area AA3.

After the dummy data is supplied to the third pixel area AA3, supply of emission signals EO3 output from the odd emission stages EST31, EST33, EST35, may be stopped. Therefore, the third pixels PXL3' located in the odd horizontal line may emit light at the same time in response to the dummy data.

Subsequently, the supply of the emission signals EE3 output from the even emission stages EST32, EST34, EST36, . . . may be stopped because the emission signals EE3 are synchronized with the clock signal CLK3. When the display device 10 is driven in the first mode, scan signals may be supplied to the even third scan lines S32, S34, S36, . . . , and the dummy data may be supplied to the third pixel area AA3.

Subsequently, the supply of the emission signals EE3 output from the even emission stages EST32, EST34, EST36, . . . may be stopped. The third pixels PXL3' located in the even horizontal line may emit light at the same time in response to the dummy data.

The fourth start signal FLM4, not the third sub-start signal VFLM3, may be supplied to the last emission stage EST1$j$ of the first emission driver 311. The last emission stage EST1$j$ of the first emission driver 311 may generate and output the emission signal E1$j$ corresponding to the fourth start signal FLM4. The 1st emission stage EST21 of the second emission driver 312 may generate an emission signal in response to the emission signal E1$j$ output from the last stage circuit EST1$j$ of the first emission driver 311.

The fourth start signal FLM4 may be output after emission signals are supplied to the third emission lines E31 to E3$k$. In other words, the second pixels PXL2' may emit light after the first pixels PXL1' and the third pixels PXL3' emit light. The second emission driver 312 may sequentially supply emission signals to the second emission lines E21 to E2$n$.

FIG. 14 is a waveform view illustrating a method of driving the emission drivers according to another embodiment when the display device is driven in the first mode according to some example embodiments of the present invention. Referring to FIG. 14, when the display device is driven in the first mode, the third switch control signal MCS3 having a low level may be supplied to the third switch control signal line 515 and the fourth switch control signal MCS4 having a high level may be supplied to the fourth switch control signal line 525.

Therefore, all first switches TR1 of the multiplexers 219a may be turned on and all second switches TR2 thereof may be turned off. When the third switch control signal MCS3 having the low level is supplied, a third sub-start signal VFLM3' and a fourth sub-start signal VFLM4' may not be supplied. For example, each of the third sub-start signal VFLM3' and the fourth sub-start signal VFLM4' may have a high level.

When the third sub-start signal VFLM3' having a high level is supplied to the emission stages EST11 to EST1j of the first emission driver 311, an emission signal EO1' output from each of the odd emission stages EST11, EST13, EST15, . . . and an emission signal EE1' output from each of the even emission stages EST12, EST14, EST16, . . . may each have a high level.

In other words, because emission signals continue to be output so that the first pixels PXL1' may be set to a non-emission state, the first pixels PXL1' may not emit light although dummy data is supplied to the first pixels PXL1'.

In addition, when the fourth sub-start signal VFLM4' having a high level is supplied to the emission stages EST31 to EST3k of the third emission driver 313, an emission signal EO3' output from each of the odd emission stages EST31, EST33, EST35, . . . and an emission signal EE3' output from each of the even emission stages EST32, EST34, EST36, . . . may each have a high level.

In other words, because emission signals continue to be output so that the third pixels PXL3' may be set to a non-emission state, the third pixels PXL3' may not emit light although dummy data is supplied to the third pixels PXL3'.

Figure 15:
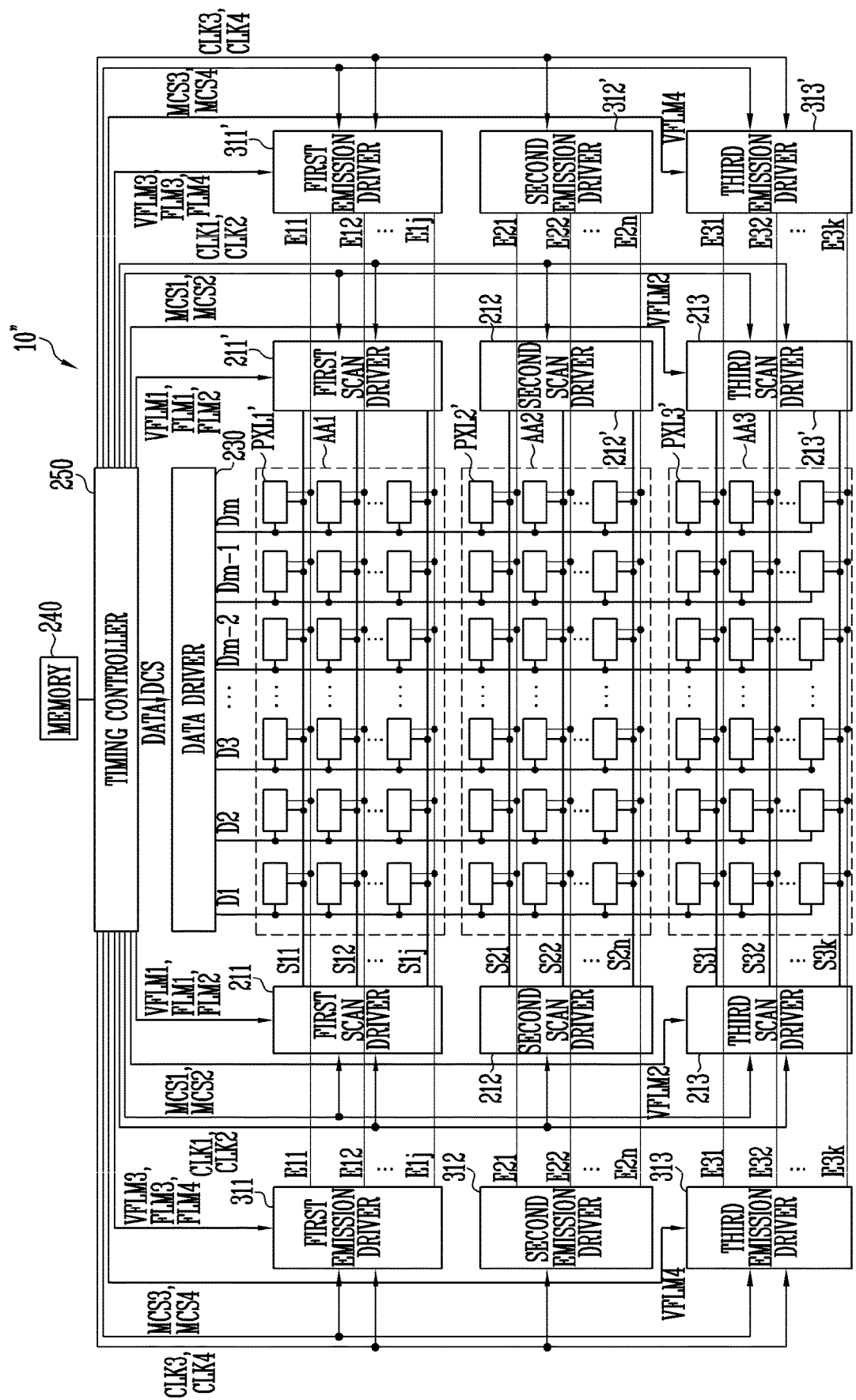
FIG. 15 is a diagram illustrating a display device, according to some example embodiments of the present invention.

FIG. 15 is a diagram illustrating a display device 10" according to some example embodiments of the present invention. When the display device 10" according to another embodiment is described with reference to FIG. 19, the same reference numerals are given to components which are the same as those of the display device 10' shown in FIG. 9, and a detailed description thereof will be omitted.

Referring to FIG. 15, the display device 10" may include the pixels PXL1', PXL2', and PXL3' and a display driver. The display driver may include first scan drivers 211 and 211', second scan drivers 212 and 212', third scan drivers 213 and 213', first emission drivers 311 and 311', second emission drivers 312 and 312', third emission drivers 313 and 313', the data driver 230, the memory 240 and the timing controller 250.

The first scan drivers 211 and 211', the second scan driver 212 and 212', and the third scan drivers 213 and 213' of the display device 10" may be located at both sides with the pixels PXL1', PXL2', and PXL3' interposed therebetween.

Because the configurations and functions of the last stage circuit EST1j, the second scan drivers 212 and 212' and the third scan drivers 213 and 213' are the same as the above-described scan drivers, a detailed description thereof will be omitted.

In addition, the first emission drivers 311 and 311', the second emission drivers 312 and 312', and the third emission drivers 313 and 313' may be located at both sides with the pixels PXL1', PXL2', and PXL3' of the display device 10" interposed therebetween.

Because the configurations and functions of the first emission drivers 311 and 311', the second emission drivers 312 and 312', and the third emission drivers 313 and 313' are the same as the above-described emission drivers, a detailed description thereof will be omitted.

As described above, when the scan drivers and the emission drivers are connected to both sides of the pixel unit, a signal delay may be avoided. According to some example embodiments of the present invention, when a display device is mounted on a wearable device and drive in a first mode, a dummy image may be displayed on a non-viewing area, so that different characteristics between driving transistors located in different areas may be prevented. Accordingly, a display device having improved display quality may be provided.

Although some example embodiments are described herein, these embodiments should not be construed to be limiting. Those of ordinary skill in the art would recognize that various changes in form and details may be made without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A display device, comprising:
a pixel unit including first pixels in a first pixel area, second pixels in a second pixel area, and third pixels in a third pixel area;
a first scan driver including first multiplexers configured to operate in response to a first mode and a second mode different from the first mode, and to supply first scan signals to first scan lines connected to the first pixels;
a second scan driver configured to supply second scan signals to second scan lines connected to the second pixels; and
a third scan driver including second multiplexers configured to operate in response to the first mode and the second mode, and to supply third scan signals to third scan lines connected to the third pixels,
wherein the second pixel area is between the first and third pixel areas and a size of a viewing area formed by the first, second, and third pixel areas in the first mode is different than the size of the viewing area in the second mode, and
wherein in the first mode, a pulse width of each of the first scan signals and the third scan signals is greater than a pulse width of each of the second scan signals.

2. The display device of claim 1, wherein the first scan driver further comprises first scan stages connected to the first scan lines, respectively, and
the first scan stages receive output signals from the first multiplexers.

3. The display device of claim 2, wherein the third scan driver further comprises third scan stages connected to the third scan lines, respectively, and
the third scan stages receive output signals from the second multiplexers.

4. The display device of claim 3, wherein each of the first multiplexers includes a first switch configured to be turned on in the first mode and a second switch configured to be turned on in the second mode.

5. The display device of claim 4, wherein the second switch of a 1st first multiplexer of the first multiplexers is configured to receive a first start signal and second switches of remaining first multiplexers are configured to receive output signals from first scan stages located in a previous horizontal line.

6. The display device of claim 4, wherein the first switch of a last first multiplexer is configured to receive a second start signal and first switches of remaining first multiplexer are configured to receive a first sub-start signal.

7. The display device of claim 6, wherein the first sub-start signal is simultaneously supplied to the first scan stages in the first mode.

8. The display device of claim 7, wherein the first scan signals are simultaneously supplied to first scan lines located in odd horizontal lines, and the first scan signals are simultaneously supplied to first scan lines located in even horizontal lines.

9. The display device of claim 8, wherein each of the second multiplexers includes a first switch configured to be turned on in the first mode and a second switch configured to be turned on in the second mode.

10. The display device of claim 9, wherein first switches of the second multiplexers are configured to receive a second sub-start signal, and second switches of the second multiplexers are configured to receive output signals from scan stages located in a previous horizontal line.

11. The display device of claim 10, wherein the second sub-start signal is simultaneously supplied to the third scan stages in the first mode.

12. The display device of claim 11, wherein the third scan signals are simultaneously supplied to the scan lines located in the odd horizontal lines, and third scan signals are simultaneously supplied to third scan lines located in the even horizontal lines.

13. The display device of claim 12, further comprising:
a first emission driver including third multiplexers configured to operate in response to the first mode and the second mode, and to supply first emission signals to first emission lines connected to the first pixels;
a second emission driver configured to supply second emission signals to second emission lines connected to the second pixels; and
a third emission driver including fourth multiplexers configured to operate in response to the first mode and the second mode, and to supply third emission signals to third emission lines connected to the third pixels.

14. The display device of claim 13, wherein the first emission driver further comprises first emission stages connected to the first emission lines, respectively, and the first emission stages are configured to receive output signals from the third multiplexers.

15. The display device of claim 14, wherein the third emission driver further comprises third emission stages connected to the third emission lines, respectively, and the third emission stages are configured to receive output signals from the fourth multiplexers.

16. The display device of claim 15, wherein each of the third multiplexers and the fourth multiplexers includes a first switch configured to be turned on in the first mode and a second switch configured to be turned on in the second mode.

17. The display device of claim 16, wherein the second switch of a 1st third multiplexer of the third multiplexers is configured to receive a third start signal, and second switches of remaining third multiplexers are configured to receive output signals from first emission stages located in the previous horizontal line.

18. The display device of claim 17, wherein the first switch of a last third multiplexer is configured to receive a fourth start signal and first switches of remaining third multiplexers are configured to receive a third sub-start signal.

19. The display device of claim 18, wherein the third sub-start signal is simultaneously supplied to the first emission stages in the first mode.

20. The display device of claim 19, wherein in the first mode, the first emission signals are simultaneously supplied to first emission lines located in odd horizontal lines, and the first emission signals are simultaneously supplied to first emission lines located in even horizontal lines.

21. The display device of claim 16, wherein first switches of the fourth multiplexers are configured to receive a fourth sub-start signal, and second switches of the fourth multiplexers are configured to receive output signals from emission stages located in the previous horizontal line.

22. The display device of claim 21, wherein the fourth sub-start signal is simultaneously supplied to the third emission stages in the first mode.

23. The display device of claim 22, wherein in the first mode, the third emission signals are simultaneously supplied to third emission lines located in odd horizontal lines, and the third emission signals are simultaneously supplied to third emission lines located in even horizontal lines.

24. The display device of claim 13, wherein the first emission driver, the second emission driver and the third scan driver are configured to cause the first pixel area, the second pixel area and the third pixel area to sequentially emit light during a single frame period in the second mode.

25. The display device of claim 13, wherein the first emission driver, the second emission driver and the third scan driver are configured to cause the second pixel area to emit light after the first pixel area and the third pixel area emit light during a single frame period in the first mode.

26. The display device of claim 1, wherein the first scan driver, the second scan driver and the third scan driver are configured to sequentially output the first scan signals, the second scan signals and the third scan signals, respectively, during a single frame period in the second mode.

27. The display device of claim 1, wherein the first scan driver, the second scan driver and the third scan driver are configured to sequentially output the second scan signals after outputting the first scan signals and the third scan signals in the first mode.

28. The display device of claim 1, wherein the first pixel area is adjacent to a first horizontal line of the second pixel area and the third pixel area is adjacent to a last horizontal line of the second pixel area.

29. The display device of claim 28, further comprising a data driver configured to supply data signals to data lines connected to the first pixels, the second pixels and the third pixels.

30. The display device of claim 29, further comprising a memory configured to store a first dummy data signal corresponding to an image displayed on the first horizontal line of the second pixel area and a second dummy data signal corresponding to an image displayed on the last horizontal line of the second pixel area during a previous frame in the first mode.

31. The display device of claim 30, wherein the data driver is configured to supply the first dummy data signal to the first pixels and the second dummy data signal to the third pixels in the first mode.

32. The display device of claim 1, wherein the display device is set to the first mode when the display device is mounted on a wearable device, and otherwise, set to the second mode.

33. A display device, comprising:
a pixel unit including first pixels in a first pixel area, second pixels in a second pixel area, and third pixels in a third pixel area;

a first scan driver including first multiplexers configured to operate in response to a first mode and a second mode different from the first mode, and to supply first scan signals to first scan lines connected to the first pixels;

a second scan driver configured to supply second scan signals to second scan lines connected to the second pixels; and a third scan driver including second multiplexers configured to operate in response to the first mode and the second mode, and to supply third scan signals to third scan lines connected to the third pixels, wherein the second pixel area is between the first and third pixel areas, wherein a size of a viewing area formed by the first, second, and third pixel areas in the first mode is different than the size of the viewing area in the second mode, and wherein in the first mode, during a current frame, each horizontal line of the first pixel area is configured to display the same image as an image displayed on a first horizontal line of the second pixel area during a previous frame.

34. The display device of claim 33, wherein in the first mode, during the current frame, each horizontal line of the third pixel area is configured to display the same image as an image displayed on a last horizontal line of the second pixel area during the previous frame.

* * * * *